(12) United States Patent
Zawisza et al.

(10) Patent No.: US 12,472,613 B2
(45) Date of Patent: Nov. 18, 2025

(54) PERCUSSION TOOL

(71) Applicant: MILWAUKEE ELECTRIC TOOL CORPORATION, Brookfield, WI (US)

(72) Inventors: Matthew S. Zawisza, Pewaukee, WI (US); Andrew D. Van Hoorn, Menomonee Falls, WI (US); Ethan T. Zimany, Kenosha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/508,298

(22) Filed: Nov. 14, 2023

(65) Prior Publication Data
US 2024/0083003 A1    Mar. 14, 2024

Related U.S. Application Data

(60) Continuation of application No. 17/307,019, filed on May 4, 2021, now Pat. No. 11,865,687, which is a
(Continued)

(51) Int. Cl.
*B25D 11/06*     (2006.01)
*B25D 11/00*     (2006.01)
(Continued)

(52) U.S. Cl.
CPC .......... *B25D 11/064* (2013.01); *B25D 11/005* (2013.01); *B25D 11/125* (2013.01);
(Continued)

(58) Field of Classification Search
CPC .................. B25D 11/064; B25D 17/06; B25D 2217/008; B25D 2217/0084; B25D 2217/0088; B25D 2217/0092
See application file for complete search history.

(56) References Cited

U.S. PATENT DOCUMENTS

| 2,270,840 A | 1/1942 | Allen |
| 3,028,840 A | 4/1962 | Leavell |

(Continued)

FOREIGN PATENT DOCUMENTS

| BE | 1023584 B1 | 5/2017 |
| DE | 2219320 B1 | 10/1973 |

(Continued)

OTHER PUBLICATIONS

Milwaukee Tool, K2500H Fact Sheet, 2017, 3 pages.
(Continued)

*Primary Examiner* — Anna K Kinsaul
*Assistant Examiner* — Nicholas E Igbokwe
(74) *Attorney, Agent, or Firm* — Michael Best & Friedrich LLP

(57) ABSTRACT

A percussion tool includes a housing, a percussion mechanism including a striker supported for reciprocation in the housing along a first axis, and an anti-vibration system for attenuating vibration in a direction of the first axis. The anti-vibration system includes a linkage coupling the percussion mechanism to the housing. The linkage permits relative movement between the housing and the percussion mechanism along the first axis. The anti-vibration system also includes a counterweight supported by the percussion mechanism for relative movement therewith along a second axis that is parallel with the first axis. The counterweight reciprocates out of phase with the striker to attenuate vibration in the direction of the first axis.

16 Claims, 21 Drawing Sheets

Related U.S. Application Data division of application No. 16/257,600, filed on Jan. 25, 2019, now Pat. No. 11,059,155.

(60) Provisional application No. 62/650,737, filed on Mar. 30, 2018, provisional application No. 62/622,615, filed on Jan. 26, 2018.

(51) Int. Cl.

| | | |
|---|---|---|
| *B25D 11/12* | (2006.01) | |
| *B25D 17/04* | (2006.01) | |
| *B25D 17/06* | (2006.01) | |
| *B25D 17/24* | (2006.01) | |
| *B25D 17/26* | (2006.01) | |
| *B25F 5/00* | (2006.01) | |
| *B25F 5/02* | (2006.01) | |
| *H01M 50/247* | (2021.01) | |
| *H02K 7/14* | (2006.01) | |
| *H02P 29/00* | (2016.01) | |

(52) U.S. Cl.
CPC .............. *B25D 17/04* (2013.01); *B25D 17/06* (2013.01); *B25D 17/24* (2013.01); *B25D 17/26* (2013.01); *B25F 5/00* (2013.01); *B25F 5/02* (2013.01); *H01M 50/247* (2021.01); *H02K 7/145* (2013.01); *H02P 29/00* (2013.01); *B25D 2250/095* (2013.01); *B25D 2250/121* (2013.01); *B25D 2250/175* (2013.01); *B25D 2250/201* (2013.01); *B25D 2250/221* (2013.01); *B25D 2250/391* (2013.01); *H01M 2220/30* (2013.01)

(56) References Cited

U.S. PATENT DOCUMENTS

| | | |
|---|---|---|
| 3,028,841 A | 4/1962 | Leavell |
| 3,299,967 A | 1/1967 | Cabot et al. |
| 3,335,805 A | 8/1967 | Diez et al. |
| 3,559,751 A | 2/1971 | Yamada |
| 3,568,780 A | 3/1971 | Matsuo |
| 3,570,608 A | 3/1971 | Erma |
| 3,727,700 A | 4/1973 | Amtsberg |
| 3,735,823 A | 5/1973 | Terada |
| 3,797,586 A | 3/1974 | Coyne et al. |
| 3,822,001 A | 7/1974 | Sides |
| 3,824,417 A | 7/1974 | Moores, Jr. |
| 3,835,935 A | 9/1974 | Sides et al. |
| 3,881,554 A | 5/1975 | Cooley et al. |
| 3,995,703 A | 12/1976 | Wanner |
| 4,030,553 A | 6/1977 | Rockwell |
| 4,057,114 A | 11/1977 | Anderson |
| 4,166,375 A | 9/1979 | Stepantsov et al. |
| 4,168,751 A | 9/1979 | Deike |
| 4,282,938 A | 8/1981 | Minamidate |
| 4,290,489 A | 9/1981 | Leavell |
| 4,305,473 A | 12/1981 | Gidlund |
| 4,310,055 A | 1/1982 | Wanner et al. |
| 4,332,300 A | 6/1982 | Scarton et al. |
| 4,476,941 A | 10/1984 | Buck et al. |
| 4,478,293 A | 10/1984 | Weilenmann et al. |
| 4,489,261 A | 12/1984 | Hartwig et al. |
| 4,582,144 A | 4/1986 | Mizutani |
| 4,614,241 A | 9/1986 | Crover |
| 4,705,934 A | 11/1987 | Winkler |
| 4,723,610 A * | 2/1988 | Dummermuth ........ B25D 17/24 29/81.14 |
| 4,747,455 A | 5/1988 | Cunningham |
| 4,828,046 A | 5/1989 | Pyatov |
| 4,884,642 A | 12/1989 | Fadeev et al. |
| 4,991,664 A | 2/1991 | Kolgan et al. |
| 5,099,926 A | 3/1992 | Fushiya et al. |
| 5,117,923 A | 6/1992 | Wuhrer |
| 5,161,623 A | 11/1992 | Erlach |
| 5,205,363 A | 4/1993 | Pascale |
| 5,458,205 A | 10/1995 | Wijk |
| 5,525,842 A | 6/1996 | Leininger |
| 5,586,607 A | 12/1996 | Neumaier et al. |
| 5,647,525 A | 7/1997 | Ishizawa |
| 5,775,201 A | 7/1998 | Tanji et al. |
| 5,971,083 A | 10/1999 | Wiklund |
| 5,971,403 A | 10/1999 | Yahagi et al. |
| 5,996,708 A | 12/1999 | Gerold |
| 6,112,831 A | 9/2000 | Gustafsson |
| 6,116,352 A | 9/2000 | Frauhammer et al. |
| 6,119,796 A | 9/2000 | Schmid |
| 6,152,245 A | 11/2000 | Nilsson |
| 6,155,356 A | 12/2000 | Kikuchi et al. |
| 6,237,700 B1 | 5/2001 | Berger et al. |
| 6,325,157 B1 | 12/2001 | Arakawa et al. |
| 6,443,675 B1 | 9/2002 | Kopras et al. |
| 6,513,604 B2 | 2/2003 | Hanke |
| 6,520,266 B2 | 2/2003 | Bongers-Ambrosius et al. |
| 6,520,269 B2 | 2/2003 | Geiger et al. |
| 6,523,622 B1 | 2/2003 | Berger et al. |
| 6,568,484 B1 | 5/2003 | Schmid et al. |
| 6,575,254 B2 | 6/2003 | Bongers-Ambrosius et al. |
| 6,616,446 B1 | 9/2003 | Schmid |
| 6,621,241 B2 | 9/2003 | Reid et al. |
| 6,729,412 B2 | 5/2004 | Shinohara |
| 6,732,815 B2 | 5/2004 | Hanke et al. |
| 6,745,850 B2 | 6/2004 | Hahn |
| 6,763,897 B2 | 7/2004 | Hanke et al. |
| 6,776,245 B2 | 8/2004 | Kristen et al. |
| 6,799,643 B2 | 10/2004 | Voulkidis et al. |
| 6,799,644 B2 | 10/2004 | Hoop et al. |
| 6,805,206 B2 | 10/2004 | Hanke |
| 6,808,026 B2 | 10/2004 | Berger et al. |
| 6,854,530 B1 | 2/2005 | Yiu |
| 6,866,105 B2 | 3/2005 | Pfisterer et al. |
| 6,868,918 B2 | 3/2005 | Shinohara |
| 6,877,569 B2 | 4/2005 | Koskimäki |
| 6,902,012 B2 | 6/2005 | Kristen et al. |
| 6,907,942 B2 | 6/2005 | Kikuchi et al. |
| 6,907,943 B2 | 6/2005 | Ikuta |
| 6,938,704 B2 | 9/2005 | Berger et al. |
| 6,938,705 B2 | 9/2005 | Kikuchi |
| 6,948,570 B2 | 9/2005 | Kristen et al. |
| 6,948,571 B2 | 9/2005 | Hanke et al. |
| 6,962,211 B2 | 11/2005 | Daubner et al. |
| 6,978,847 B2 | 12/2005 | Buchholz |
| 6,981,625 B2 | 1/2006 | Schad |
| 7,011,156 B2 | 3/2006 | von Gynz-Rekowski |
| 7,013,984 B2 | 3/2006 | Atkinson et al. |
| 7,021,401 B2 | 4/2006 | Droste et al. |
| 7,025,183 B2 | 4/2006 | Steffan et al. |
| 7,036,703 B2 | 5/2006 | Grazioli et al. |
| 7,040,413 B2 | 5/2006 | Mueller et al. |
| 7,048,076 B2 | 5/2006 | Cecchin et al. |
| 7,077,217 B2 | 7/2006 | Buchholz |
| 7,096,973 B2 | 8/2006 | Ikuta et al. |
| 7,121,360 B2 | 10/2006 | Fünfer |
| 7,124,840 B2 | 10/2006 | Miyakawa |
| 7,143,842 B2 | 12/2006 | Ikuta |
| 7,204,322 B2 | 4/2007 | Sakai |
| 7,252,157 B2 | 8/2007 | Aoki |
| 7,258,173 B2 | 8/2007 | Hammerstingl et al. |
| 7,284,622 B2 | 10/2007 | Hahn |
| 7,320,368 B2 | 1/2008 | Watanabe |
| 7,331,407 B2 | 2/2008 | Stirm et al. |
| 7,334,648 B2 | 2/2008 | Arimura |
| 7,383,895 B2 | 6/2008 | Aoki |
| 7,401,661 B2 | 7/2008 | Berghauser et al. |
| 7,413,026 B2 | 8/2008 | Berghauser et al. |
| 7,445,054 B2 | 11/2008 | Heep et al. |
| 7,445,056 B2 | 11/2008 | Stirm et al. |
| 7,451,833 B2 | 11/2008 | Hahn |
| 7,469,752 B2 | 12/2008 | Furusawa et al. |
| 7,500,527 B2 | 3/2009 | Fischer et al. |
| 7,513,317 B2 | 4/2009 | Satou |
| 7,516,801 B2 | 4/2009 | Meixner et al. |
| 7,523,791 B2 | 4/2009 | Aoki |

(56) References Cited

U.S. PATENT DOCUMENTS

| | | |
|---|---|---|
| 7,533,736 B2 | 5/2009 | Stirm et al. |
| 7,562,721 B2 | 7/2009 | Stirm et al. |
| 7,588,097 B2 | 9/2009 | Kamegai et al. |
| 7,604,071 B2 | 10/2009 | Ikuta |
| D603,674 S | 11/2009 | Werner |
| 7,624,815 B2 | 12/2009 | Friedrich et al. |
| 7,637,328 B2 | 12/2009 | Sato |
| 7,640,997 B2 | 1/2010 | Bram et al. |
| 7,654,338 B2 | 2/2010 | Herting et al. |
| 7,677,327 B2 | 3/2010 | Meixner et al. |
| 7,712,547 B2 | 5/2010 | Ikuta et al. |
| 7,726,413 B2 | 6/2010 | Berghauser et al. |
| 7,766,096 B2 | 8/2010 | Satou et al. |
| 7,784,562 B2 | 8/2010 | Ikuta |
| 7,802,711 B2 | 9/2010 | Fuenfer |
| 7,806,201 B2 | 10/2010 | Aoki |
| 7,814,986 B2 | 10/2010 | Berghauser et al. |
| 7,819,203 B2 | 10/2010 | Sato et al. |
| 7,832,498 B2 | 11/2010 | Sugiyama et al. |
| 7,861,799 B2 | 1/2011 | Iwakami et al. |
| 7,878,264 B2 | 2/2011 | Koch et al. |
| 7,882,899 B2 | 2/2011 | Borinato et al. |
| 7,882,900 B2 | 2/2011 | Borinato et al. |
| 7,921,934 B2 | 4/2011 | Aoki |
| 7,926,584 B2 | 4/2011 | John et al. |
| 7,938,196 B2 | 5/2011 | Fischer et al. |
| 7,967,078 B2 | 6/2011 | Aoki |
| 7,987,921 B2 | 8/2011 | Hahn |
| 8,011,443 B2 | 9/2011 | Meixner et al. |
| 8,016,047 B2 | 9/2011 | Ookubo et al. |
| 8,074,734 B2 | 12/2011 | Gumpert et al. |
| 8,087,472 B2 | 1/2012 | Usselman et al. |
| 8,091,651 B2 | 1/2012 | Kuhnle et al. |
| 8,096,369 B2 | 1/2012 | Meixner |
| 8,127,862 B2 | 3/2012 | Aoki |
| 8,176,997 B2 | 5/2012 | Ohlendorf |
| 8,181,715 B2 | 5/2012 | Bito et al. |
| 8,196,674 B2 | 6/2012 | Ikuta et al. |
| 8,235,138 B2 | 8/2012 | Aoki |
| 8,245,791 B2 | 8/2012 | Kriedel et al. |
| D666,468 S | 9/2012 | Braun |
| 8,261,851 B2 | 9/2012 | Ikuta et al. |
| 8,261,854 B2 | 9/2012 | Kikiuchi et al. |
| 8,267,191 B2 | 9/2012 | Furusawa et al. |
| 8,292,002 B2 | 10/2012 | Baumann et al. |
| 8,302,701 B2 | 11/2012 | Morimura et al. |
| 8,333,251 B2 | 12/2012 | Cecchin et al. |
| 8,342,260 B2 | 1/2013 | Buchenau et al. |
| 8,347,981 B2 | 1/2013 | Aoki |
| 8,360,168 B2 | 1/2013 | Kikiuchi et al. |
| 8,413,742 B2 | 4/2013 | Ikuta et al. |
| 8,485,274 B2 | 7/2013 | Ikuta et al. |
| 8,505,647 B2 | 8/2013 | Kasuya et al. |
| 8,534,376 B2 | 9/2013 | Braun et al. |
| 8,561,716 B2 | 10/2013 | Aoki |
| 8,590,633 B2 | 11/2013 | Berghauser et al. |
| 8,613,328 B2 | 12/2013 | Meixner et al. |
| 8,616,301 B2 | 12/2013 | John et al. |
| 8,668,026 B2 | 3/2014 | Aoki |
| 8,678,106 B2 | 3/2014 | Matsunaga et al. |
| 8,695,723 B2 | 4/2014 | Werner et al. |
| 8,695,724 B2 | 4/2014 | Nakashima |
| 8,844,647 B2 | 9/2014 | Kamegai et al. |
| 8,955,615 B2 | 2/2015 | John et al. |
| 8,960,323 B2 | 2/2015 | Oberheim |
| 8,985,236 B2 | 3/2015 | Wierer et al. |
| 9,044,848 B2 | 6/2015 | Lio |
| 9,067,312 B2 | 6/2015 | Koch et al. |
| 9,085,075 B2 | 7/2015 | Ikuta |
| 9,126,320 B2 | 9/2015 | Shinma et al. |
| 9,132,541 B2 | 9/2015 | John et al. |
| 9,156,152 B2 | 10/2015 | Machida |
| 9,259,830 B2 | 2/2016 | Schad et al. |
| 9,296,095 B2 | 3/2016 | Yoshino et al. |
| 9,314,855 B2 | 4/2016 | Ookubo et al. |
| 9,314,912 B2 | 4/2016 | Binder et al. |
| 9,321,163 B2 | 4/2016 | Onoda et al. |
| 9,573,254 B2 | 2/2017 | Bartoszek |
| 9,654,044 B2 | 5/2017 | Miyazaki |
| 9,808,925 B2 | 11/2017 | Yamada et al. |
| 9,815,160 B2 | 11/2017 | Nitsche et al. |
| 10,814,468 B2 | 10/2020 | Krug et al. |
| 2001/0013683 A1 | 8/2001 | Yahagi |
| 2002/0053445 A1 | 5/2002 | Kim et al. |
| 2003/0006051 A1 | 1/2003 | Schmitzer et al. |
| 2003/0047887 A1 | 3/2003 | Hahn |
| 2003/0116333 A1 | 6/2003 | Voulkidis et al. |
| 2003/0155142 A1 | 8/2003 | Kikuchi et al. |
| 2004/0000414 A1 | 1/2004 | Echtler et al. |
| 2004/0065454 A1 | 4/2004 | Berger et al. |
| 2004/0065455 A1 | 4/2004 | Berger et al. |
| 2004/0144551 A1 | 7/2004 | Koskimaki |
| 2004/0163830 A1 | 8/2004 | Shinohara |
| 2004/0194986 A1 | 10/2004 | Ikuta |
| 2005/0034881 A1 | 2/2005 | Berger et al. |
| 2005/0045352 A1 | 3/2005 | Yiu |
| 2005/0072584 A1 | 4/2005 | Dresig et al. |
| 2005/0072587 A1 | 4/2005 | Clelland |
| 2005/0082073 A1 | 4/2005 | Funfer |
| 2005/0145403 A1 | 7/2005 | Kikuchi |
| 2005/0205273 A1 | 9/2005 | Yiu et al. |
| 2005/0230130 A1 | 10/2005 | Strasser et al. |
| 2005/0274534 A1 | 12/2005 | Goetzfried et al. |
| 2006/0000627 A1 | 1/2006 | Frauhammer et al. |
| 2006/0006749 A1 | 1/2006 | Sasaki et al. |
| 2006/0041241 A1 | 2/2006 | Herndon |
| 2006/0060366 A1 | 3/2006 | Bodine et al. |
| 2006/0065417 A1 | 3/2006 | Funfer et al. |
| 2006/0131042 A1 | 6/2006 | Hammerstingl et al. |
| 2006/0185868 A1 | 8/2006 | Becht |
| 2006/0237206 A1 | 10/2006 | Schamberger et al. |
| 2006/0260830 A1 | 11/2006 | Dresig |
| 2007/0107920 A1 | 5/2007 | Keller |
| 2007/0144750 A1 | 6/2007 | Buchenau et al. |
| 2007/0261871 A1 | 11/2007 | Ohlendorf |
| 2007/0277992 A1 | 12/2007 | Fuenfer |
| 2008/0006419 A1 | 1/2008 | Harcar et al. |
| 2008/0006420 A1 | 1/2008 | Berghauser et al. |
| 2008/0006422 A1 | 1/2008 | Berghauser et al. |
| 2008/0006423 A1 | 1/2008 | Berghauser et al. |
| 2008/0149359 A1 | 6/2008 | Meixner |
| 2008/0196912 A1 | 8/2008 | Gass et al. |
| 2008/0196913 A1 | 8/2008 | Bram et al. |
| 2008/0203995 A1 | 8/2008 | Carrier et al. |
| 2008/0210451 A1 | 9/2008 | Aoki |
| 2008/0217040 A1 | 9/2008 | Loeffler et al. |
| 2008/0236855 A1 | 10/2008 | Meixner et al. |
| 2008/0245220 A1 | 10/2008 | Duesselberg et al. |
| 2008/0252150 A1* | 10/2008 | Grundl ............... H02K 33/16 310/12.24 |
| 2008/0264660 A1 | 10/2008 | Berghauser et al. |
| 2008/0283260 A1 | 11/2008 | Kramer |
| 2009/0120770 A1 | 5/2009 | Hammerstingl et al. |
| 2009/0180110 A1 | 7/2009 | Drost et al. |
| 2009/0195204 A1 | 8/2009 | Gumpert |
| 2009/0275273 A1 | 11/2009 | Purohit et al. |
| 2010/0012337 A1 | 1/2010 | Meixner |
| 2010/0019690 A1 | 1/2010 | Libohova et al. |
| 2010/0163260 A1 | 7/2010 | Berger et al. |
| 2010/0175903 A1 | 7/2010 | Ikuta et al. |
| 2010/0218967 A1 | 9/2010 | Ro Kamp et al. |
| 2010/0263894 A1 | 10/2010 | Kristen et al. |
| 2010/0300718 A1 | 12/2010 | Hartmann et al. |
| 2011/0024144 A1 | 2/2011 | Usselman et al. |
| 2011/0073339 A1 | 3/2011 | Werner et al. |
| 2011/0088922 A1 | 4/2011 | Hirayama et al. |
| 2011/0108301 A1 | 5/2011 | Erhardt et al. |
| 2011/0171887 A1 | 7/2011 | Tanimoto et al. |
| 2011/0204786 A1 | 8/2011 | Schoen |
| 2011/0303429 A1 | 12/2011 | Kohlschmied et al. |
| 2011/0303430 A1 | 12/2011 | Hartmann et al. |
| 2011/0303431 A1 | 12/2011 | Hartmann et al. |
| 2011/0303717 A1 | 12/2011 | Miescher et al. |
| 2011/0303721 A1 | 12/2011 | Miescher et al. |

(56) References Cited

U.S. PATENT DOCUMENTS

| | | |
|---|---|---|
| 2011/0303733 A1 | 12/2011 | Fielitz et al. |
| 2012/0038119 A1 | 2/2012 | Koch et al. |
| 2012/0045976 A1 | 2/2012 | Roser et al. |
| 2012/0118597 A1 | 5/2012 | Hauptmann et al. |
| 2012/0118598 A1* | 5/2012 | Iio .................. B25D 17/24 173/162.1 |
| 2012/0186842 A1 | 7/2012 | Wiedmann et al. |
| 2012/0227995 A1 | 9/2012 | Diem et al. |
| 2012/0279741 A1 | 11/2012 | Schlesak et al. |
| 2013/0025895 A1 | 1/2013 | Friedrich |
| 2013/0118766 A1 | 5/2013 | Watanabe |
| 2013/0133911 A1 | 5/2013 | Ishikawa et al. |
| 2013/0186661 A1 | 7/2013 | Okubo et al. |
| 2013/0201679 A1 | 8/2013 | Pickard et al. |
| 2013/0250567 A1 | 9/2013 | Edmond et al. |
| 2013/0250579 A1 | 9/2013 | Athalye |
| 2013/0265750 A1 | 10/2013 | Pickard et al. |
| 2013/0277080 A1 | 10/2013 | Hartmann et al. |
| 2013/0333904 A1 | 12/2013 | Raggl et al. |
| 2013/0333905 A1 | 12/2013 | Binder |
| 2013/0333906 A1 | 12/2013 | Binder |
| 2013/0333910 A1 | 12/2013 | Tanimoto et al. |
| 2013/0333911 A1 | 12/2013 | Binder et al. |
| 2014/0008092 A1 | 1/2014 | Yanagihara |
| 2014/0131059 A1 | 5/2014 | Verbrugge et al. |
| 2014/0290971 A1 | 10/2014 | Kaindlbauer |
| 2014/0374130 A1 | 12/2014 | Nakamura et al. |
| 2015/0151419 A1 | 6/2015 | Bralla |
| 2015/0201170 A1 | 7/2015 | Schneider et al. |
| 2015/0231770 A1 | 8/2015 | Kusakawa et al. |
| 2015/0233537 A1 | 8/2015 | Athalye et al. |
| 2015/0252970 A1 | 9/2015 | Athalye |
| 2015/0266176 A1 | 9/2015 | Takeuchi et al. |
| 2015/0328579 A1 | 11/2015 | Ikuta et al. |
| 2015/0328759 A1 | 11/2015 | Ikuta et al. |
| 2015/0328760 A1 | 11/2015 | Ikuta et al. |
| 2015/0367492 A1* | 12/2015 | Lindell .................. B25D 17/24 173/211 |
| 2016/0020443 A1 | 1/2016 | White et al. |
| 2016/0067856 A1 | 3/2016 | Bito et al. |
| 2016/0089757 A1 | 3/2016 | Wirnitzer et al. |
| 2016/0107303 A1 | 4/2016 | Roberts |
| 2016/0129576 A1 | 5/2016 | Nishikawa et al. |
| 2016/0311102 A1* | 10/2016 | Ebner .................. H01M 50/247 |
| 2016/0354905 A1 | 12/2016 | Ely et al. |
| 2017/0028537 A1 | 2/2017 | McClung et al. |
| 2017/0057038 A1 | 3/2017 | Coleman |
| 2017/0057064 A1 | 3/2017 | Ishikawa et al. |
| 2017/0151657 A1 | 6/2017 | Nagasaka et al. |
| 2017/0173768 A1 | 6/2017 | Dey, IV et al. |
| 2017/0246732 A1 | 8/2017 | Dey, IV et al. |
| 2017/0246736 A1 | 8/2017 | Kikuchi |
| 2017/0355070 A1* | 12/2017 | Ohlendorf ............ B25D 11/062 |
| 2017/0361447 A1 | 12/2017 | Ontl et al. |
| 2018/0055518 A1 | 3/2018 | Pedicini |
| 2018/0055553 A1 | 3/2018 | Pedicini |
| 2018/0338751 A1 | 11/2018 | Pedicini |
| 2019/0255687 A1 | 8/2019 | Schneider et al. |
| 2019/0314970 A1 | 10/2019 | Hartman et al. |
| 2019/0358758 A1 | 11/2019 | Ullrich et al. |
| 2020/0215668 A1 | 7/2020 | Duncan et al. |
| 2021/0170560 A1 | 6/2021 | Kurz et al. |

FOREIGN PATENT DOCUMENTS

| | | |
|---|---|---|
| EP | 0033304 A1 | 8/1981 |
| EP | 0280195 A2 | 8/1988 |
| EP | 0318480 A1 | 6/1989 |
| EP | 0421121 B1 | 11/1993 |
| EP | 1355104 A1 | 10/2003 |
| EP | 1584422 B1 | 10/2008 |
| EP | 2199028 A2 | 6/2010 |
| EP | 1637288 B1 | 8/2014 |
| EP | 3184259 A1 | 6/2017 |
| GB | 819055 A | 8/1959 |
| GB | 1154593 A | 6/1969 |
| JP | 2008178935 A | 8/2008 |
| KR | 101681612 B1 | 12/2016 |
| WO | WO2003022531 A1 | 3/2003 |
| WO | WO2007077946 A2 | 7/2007 |
| WO | WO2007101736 A1 | 9/2007 |
| WO | WO2007105742 A1 | 9/2007 |
| WO | WO2008055743 A1 | 5/2008 |
| WO | WO2008096788 A1 | 8/2008 |
| WO | WO2009007152 A1 | 1/2009 |
| WO | WO2009015924 A1 | 2/2009 |
| WO | WO2009083317 A1 | 7/2009 |
| WO | WO2010069647 A1 | 6/2010 |
| WO | WO2011082892 A1 | 7/2011 |
| WO | WO2016059032 A1 | 4/2016 |

OTHER PUBLICATIONS

Milwaukee Tool, K2500H Owner's Manual, 2017, 49 pages.
Milwaukee Tool, K2500H Product Specification, 2017, 2 pages.
International Partial Search Report and Invitation to Pay Additional Fees for Application No. PCT/US2018/056457 dated Feb. 1, 2019, 17 pages.
International Search Report and Written Opinion for Application No. PCT/US2018/056457 dated Mar. 28, 2019, 22 pages.
International Search Report and Written Opinion for Application No. PCT/US2019/015122 dated Jul. 8, 2019, 22 pages.
Extended European Search Report for Application No. 24158872.2 dated Jun. 18, 2024 (9 pages).

* cited by examiner

PERCUSSION TOOL

CROSS-REFERENCE TO RELATED APPLICATIONS

This application is a continuation of U.S. patent application Ser. No. 17/307,019 filed on May 4, 2021, now U.S. Pat. No. 11,865,687, which is a divisional of U.S. patent application Ser. No. 16/257,600 filed on Jan. 25, 2019, now U.S. Pat. No. 11,059,155, which claims priority to U.S. Provisional Patent Application No. 62/622,615 filed on Jan. 26, 2018 and U.S. Provisional Patent Application No. 62/650,737 filed on Mar. 30, 2018, the entire contents of all of which are incorporated herein by reference.

FIELD OF THE INVENTION

The present invention relates to power tools, and more particularly to percussion tools.

BACKGROUND OF THE INVENTION

Percussion tools, such as breakers, impart axial impacts to an attached chisel to demolish a work surface. Such tools can include an anti-vibration system to attenuate vibration transmitted to the operator. Such tools also include tool holders to alternatively hold or release chisel bits for performing a breaking operation.

SUMMARY OF THE INVENTION

The present invention provides, in one aspect, a percussion tool including a housing, a percussion mechanism including a striker supported for reciprocation in the housing along a first axis, and an anti-vibration system for attenuating vibration in a direction of the first axis. The anti-vibration system includes a linkage coupling the percussion mechanism to the housing and permits relative movement between the housing and the percussion mechanism along the first axis. The anti-vibration system includes a counterweight supported by the percussion mechanism for relative movement therewith along a second axis that is parallel with the first axis. The counterweight reciprocates out of phase with the striker to attenuate vibration in the direction of the first axis.

The present invention provides, in another aspect, a percussion tool including a housing, a percussion mechanism including a striker supported for reciprocation in the housing along a first axis, a crank case supporting the percussion mechanism within the housing, and an anti-vibration system for attenuating vibration in a direction of the first axis. The anti-vibration system includes a linkage coupling the percussion mechanism to the housing to permit relative movement between the housing and the percussion mechanism along the first axis. The linkage including a first swing arm pivotally coupling the crank case to the housing, and a second swing arm pivotally coupling the crank case to the housing, the second swing arm being parallel with the first swing arm. The anti-vibration system includes a leaf spring arranged between the housing and the crank case. The anti-vibration system includes a foam bumper arranged between the housing and the crank case. Each of the leaf spring and the foam bumper attenuates vibration transmitted to an operator through the crank case and the housing.

The present invention provides, in yet another aspect, a percussion tool including a housing, a percussion mechanism including a striker supported for reciprocation in the housing along a first axis, a crank case supporting the percussion mechanism within the housing, and an anti-vibration system for attenuating vibration in a direction of the first axis. The anti-vibration system includes a counterweight supported by the percussion mechanism for relative movement therewith along a second axis that is parallel with the first axis. The counterweight reciprocates out of phase with the striker to attenuate vibration in the direction of the first axis. The anti-vibration system includes a linkage coupling the percussion mechanism to the housing that permits relative movement between the housing and the percussion mechanism along the first axis. The linkage including a first swing arm pivotally coupling the crank case to the housing, a second swing arm pivotally coupling the crank case to the housing, the first and second swing arms each pivoting about a third axis, and a third swing arm pivotally coupling the crank case to the housing. The third swing arm pivots about a fourth axis that is parallel to the third axis.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
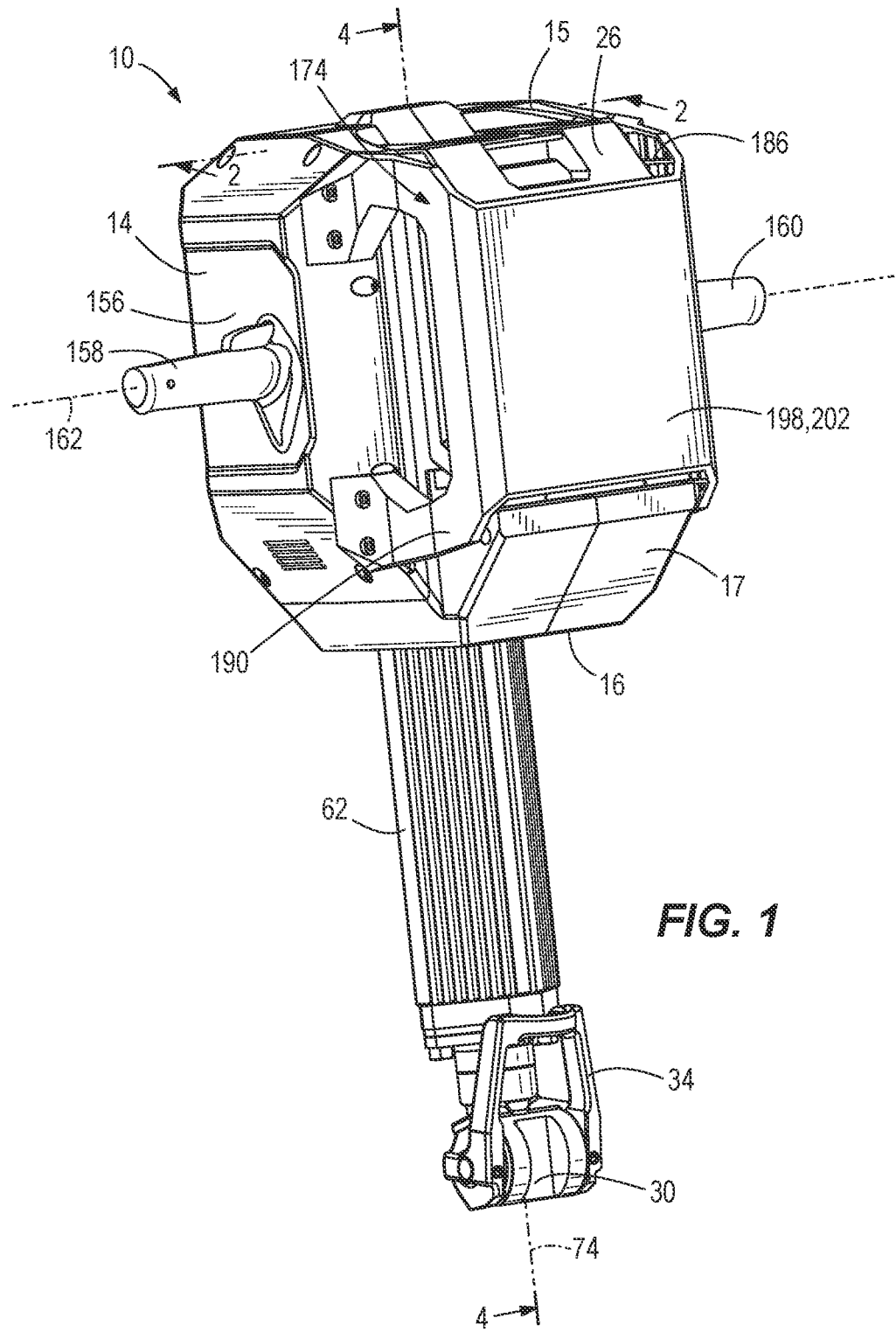
FIG. 1 is a perspective view of a percussion tool in accordance with an embodiment of the invention.
Figure 9:
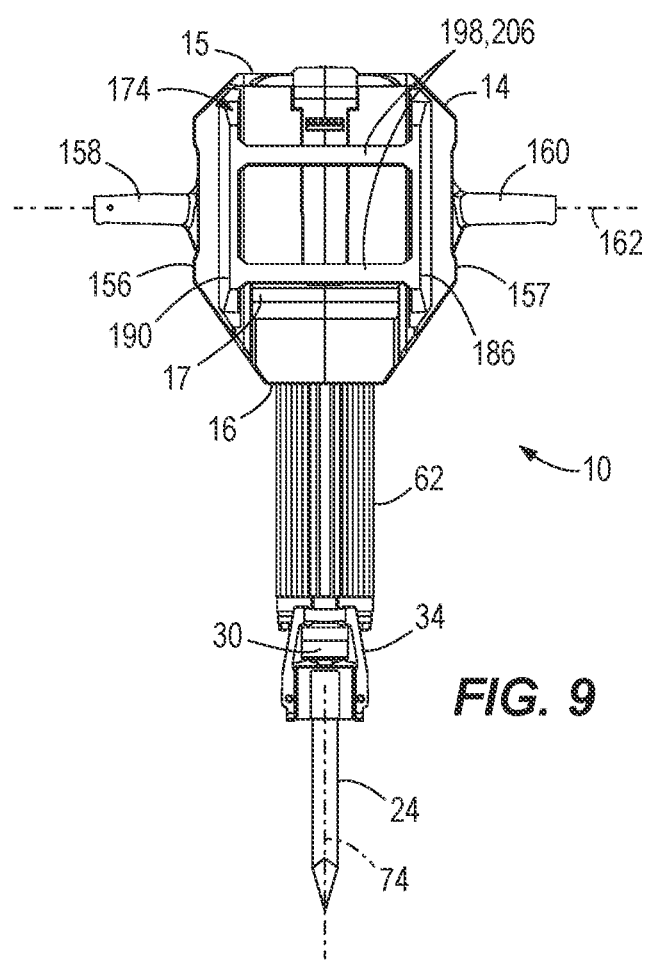
FIG. 9 is a front view of another embodiment of the percussion tool of FIG. 1.
Figure 10:
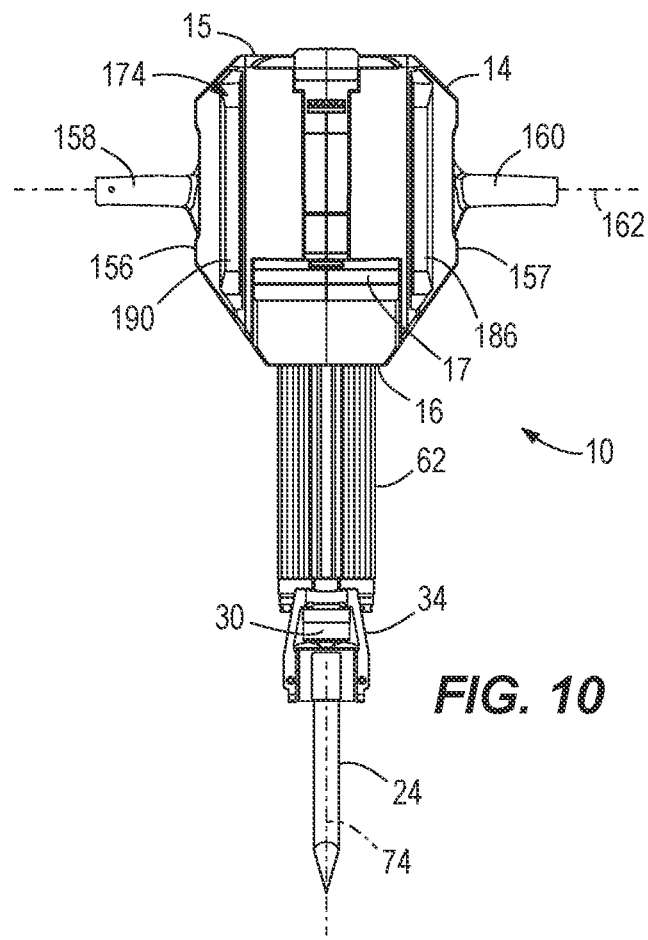
FIG. 10 is a front plan view of yet another embodiment of the percussion tool of FIG. 1.
Figure 11:
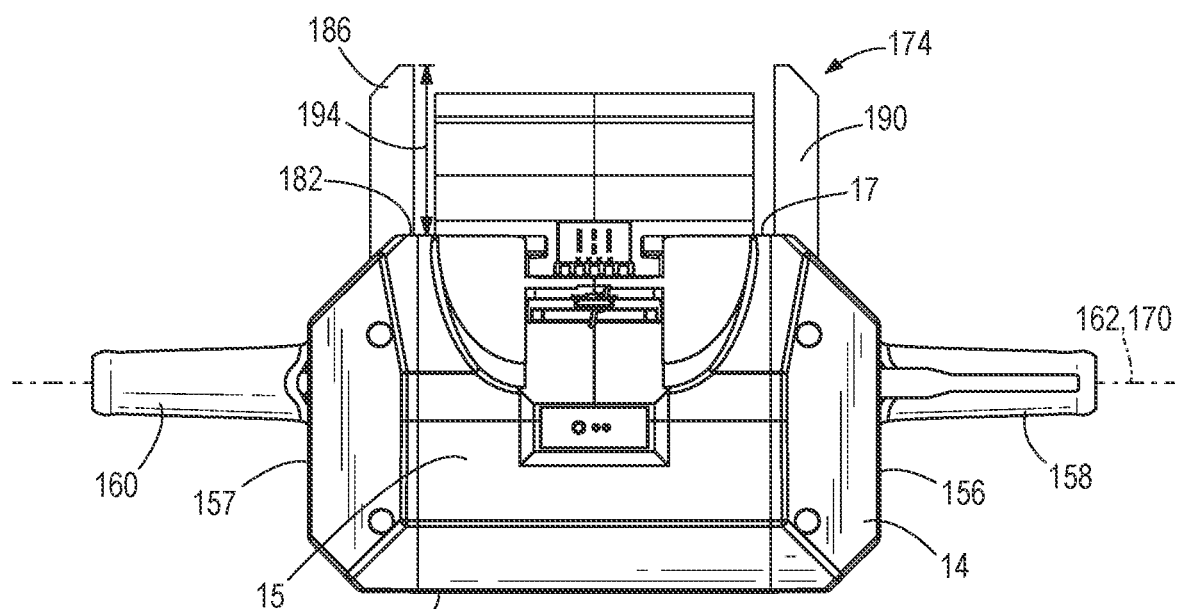
FIG. 11 is a top plan view of the percussion tool of FIG. 10.
Figure 12:
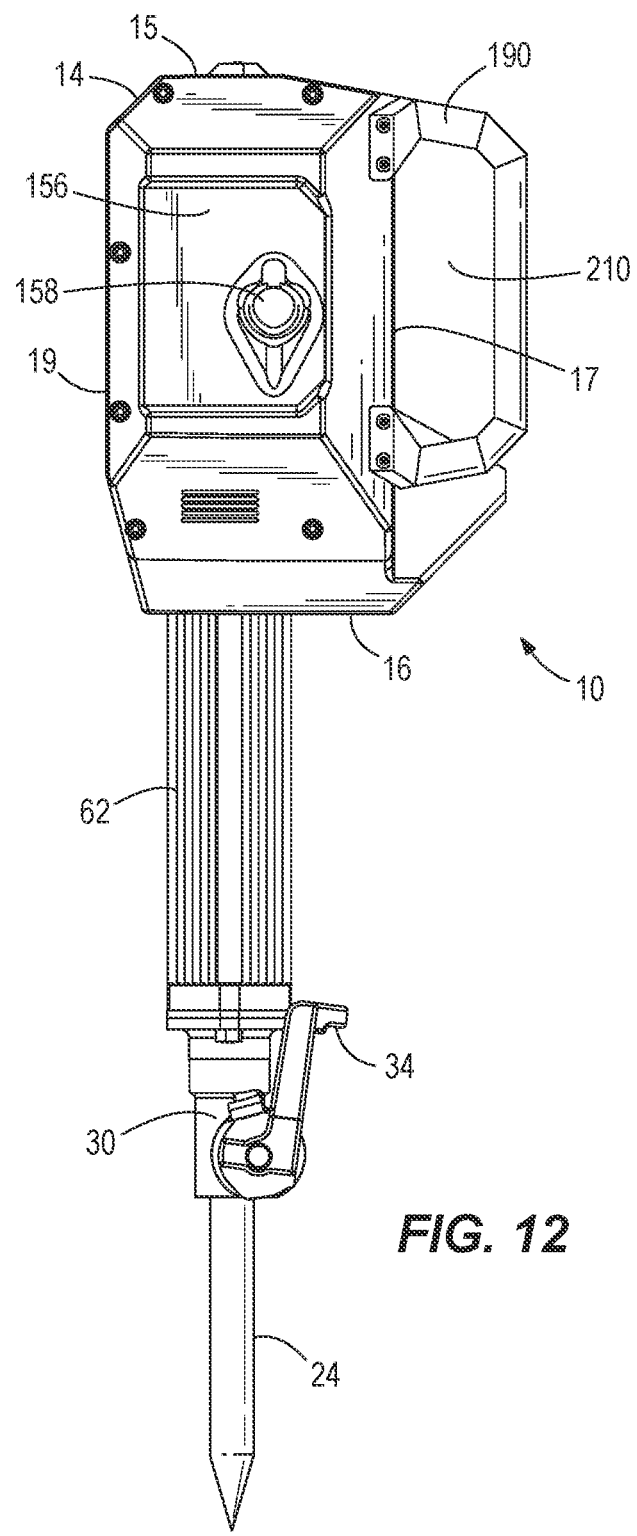
FIG. 12 is a plan view of the percussion tool of FIG. 1 with a battery removed.
Figure 25:
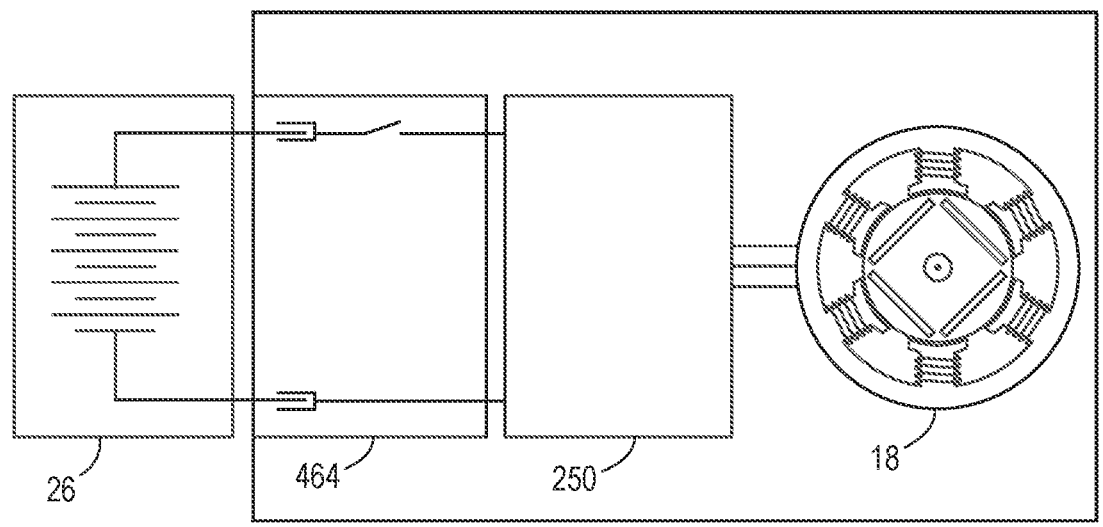
FIG. 25 is a schematic view of the percussion tool of FIG. 20.

FIG. 1 illustrates a percussion tool, such as a breaker 10, according to an embodiment of the invention. The breaker 10 includes a housing 14, a brushless electric motor 18 supported within a crank case 20 (FIG. 2), and a percussion mechanism 22 driven by the motor to impart repeated percussive impacts on a surface or workpiece via a chisel 24 (FIGS. 9, 10 and 12). The housing 14 includes a top end 15, a bottom end 16, a front side 17, and a rear side 19 behind which the operator stands to operate the breaker 10. The breaker 10 includes a battery pack 26 (FIG. 1) that is attachable to the front side 17 of the housing 14 and configured to provide electrical power to the motor 18. The battery pack 26 may include any of a number of different nominal voltages (e.g., 12 V, 18 V, etc.), and may be configured having any of a number of different chemistries (e.g., lithium-ion, nickel-cadmium, etc.). In the illustrated embodiment, the battery pack 26 includes a battery pack housing 468 and a plurality of individual battery cells 480 within the battery pack housing 468 (FIG. 27), as described in further detail below. The battery pack 26 is removable from the housing 14 for attachment to a remote charging station. As discussed in further detail below, the breaker 10 further includes a controller 250 (FIG. 25) for activating and deactivating the motor 18 in response to user input.

The chisel 24 is mounted within a tool holder 30 of the breaker 10. The tool holder 30 includes a rotatable handle 34 including a locking rod 38 within a recess 42 of the tool holder 30. When the handle 34 is rotated to the position shown in FIGS. 1, 4, 7, 9, 10, 12 and 20 the locking rod 38 moves to a position to engage a longitudinal groove of the chisel 24 to prevent the chisel 24 from falling out when the tool holder 30 is oriented downwardly. A similar locking rod and chisel is described and illustrated in U.S. patent application Ser. No. 16/164,000 filed on Oct. 18, 2018, the entire content of which is incorporated herein by reference.

Figure 2:
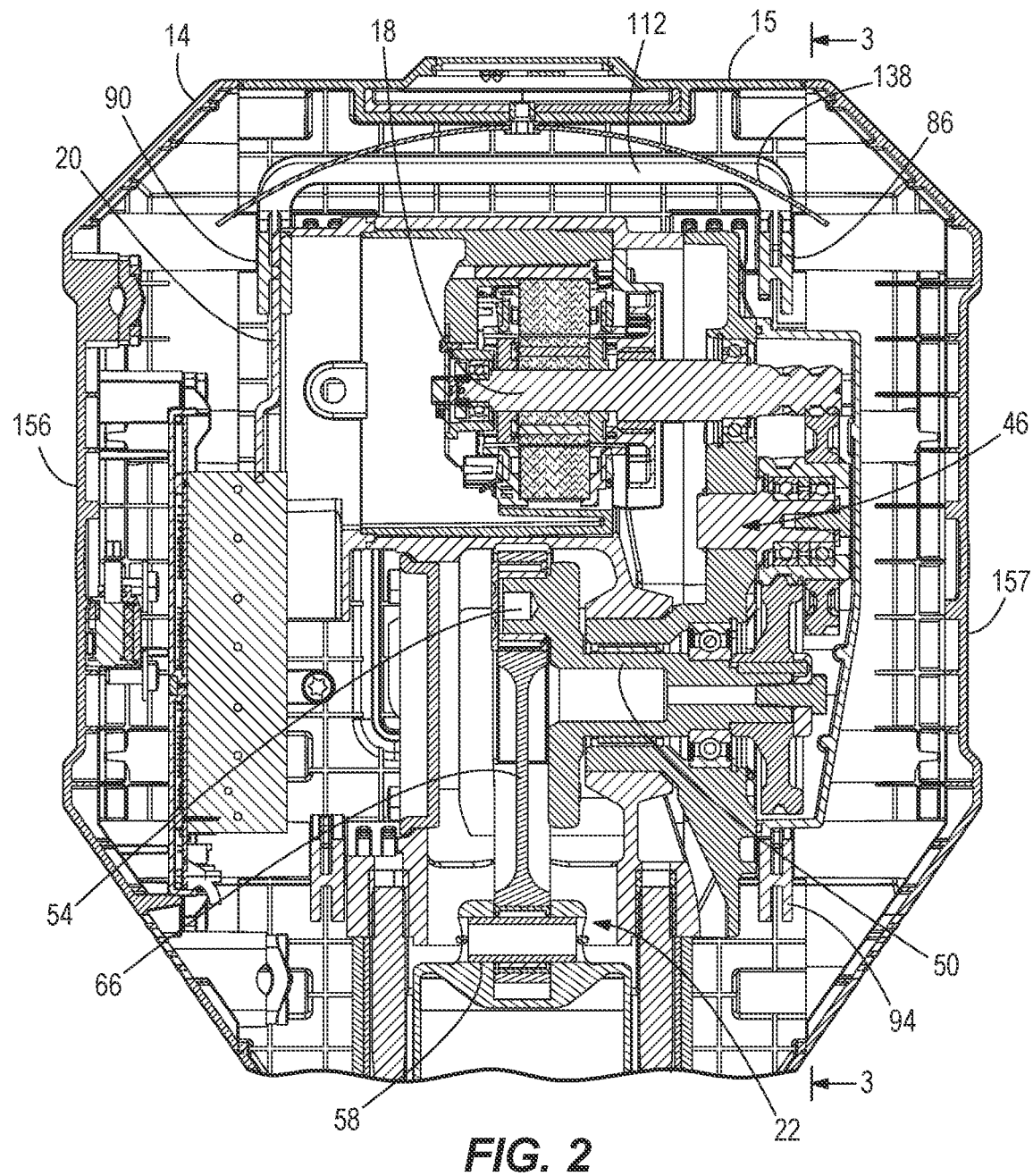
FIG. 2 is a cross-sectional view of the percussion tool of FIG. 1.

As shown in FIG. 2, the breaker 10 also includes a gear train 46 rotationally supported by the crank case 20 for transmitting torque from the motor 18 to the percussion mechanism 22. The percussion mechanism 22 includes a crank shaft 50 having an eccentric pin 54, a reciprocating piston 58 disposed within a cylinder 62 extending from the bottom side 16 of the housing 14, and a connecting rod 66 interconnecting the piston 58 and the eccentric pin 54. The percussion mechanism 22 also includes a striker 70 (FIG. 4) that is selectively reciprocable within the cylinder 62 in response to reciprocation of the piston 58. The striker 70 defines a first, striker axis 74 along which the striker 70 is configured to impart repeated axial impacts to the chisel 24 in the tool holder 30 in response to reciprocation of the piston 58. An anvil (not shown) may optionally be positioned between the striker 70 and chisel 24 to transmit the axial impacts from the striker 70 to the chisel 24.

Figure 3:
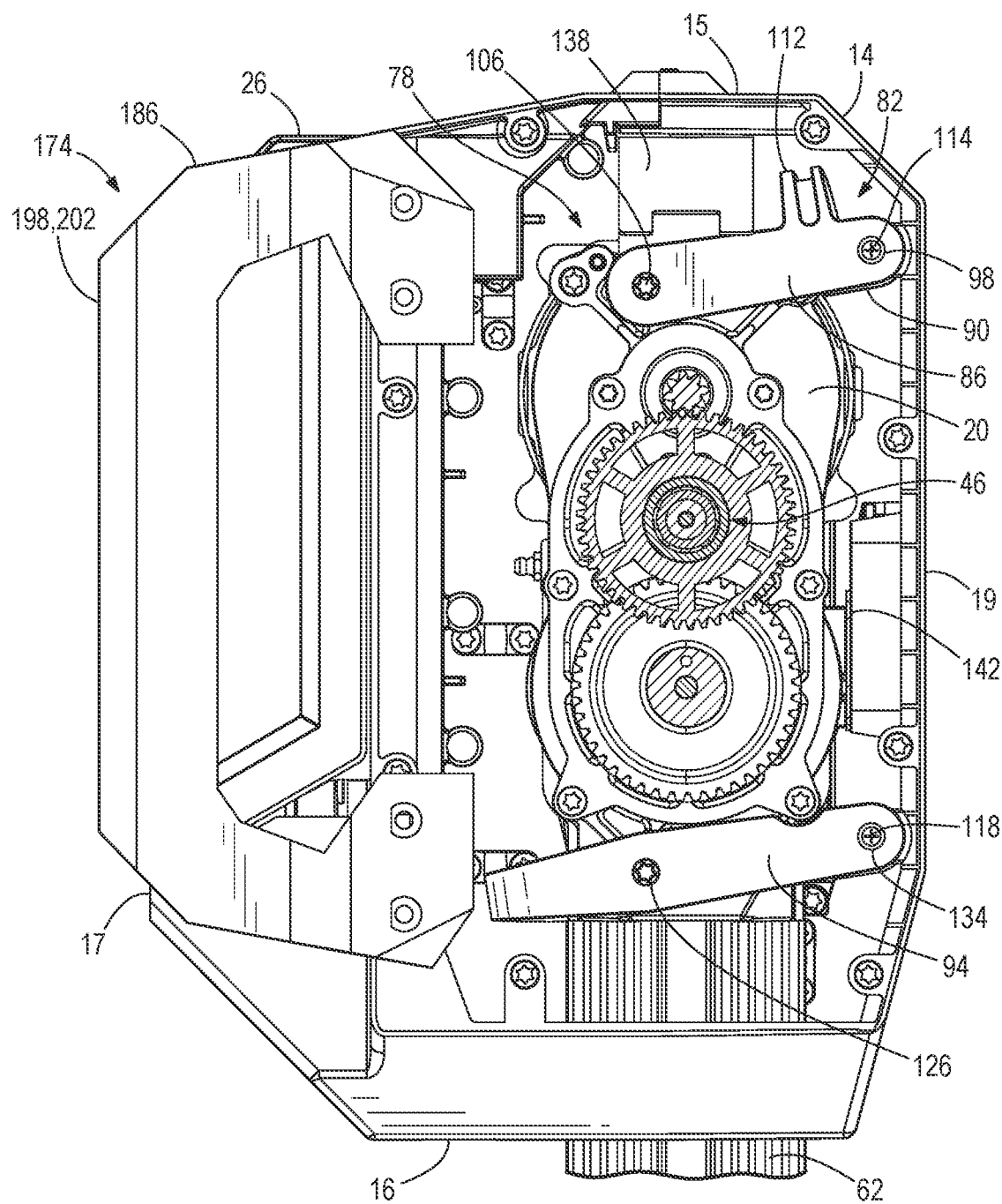
FIG. 3 is a plan view of the percussion tool of FIG. 1 with portions removed.
Figure 4:
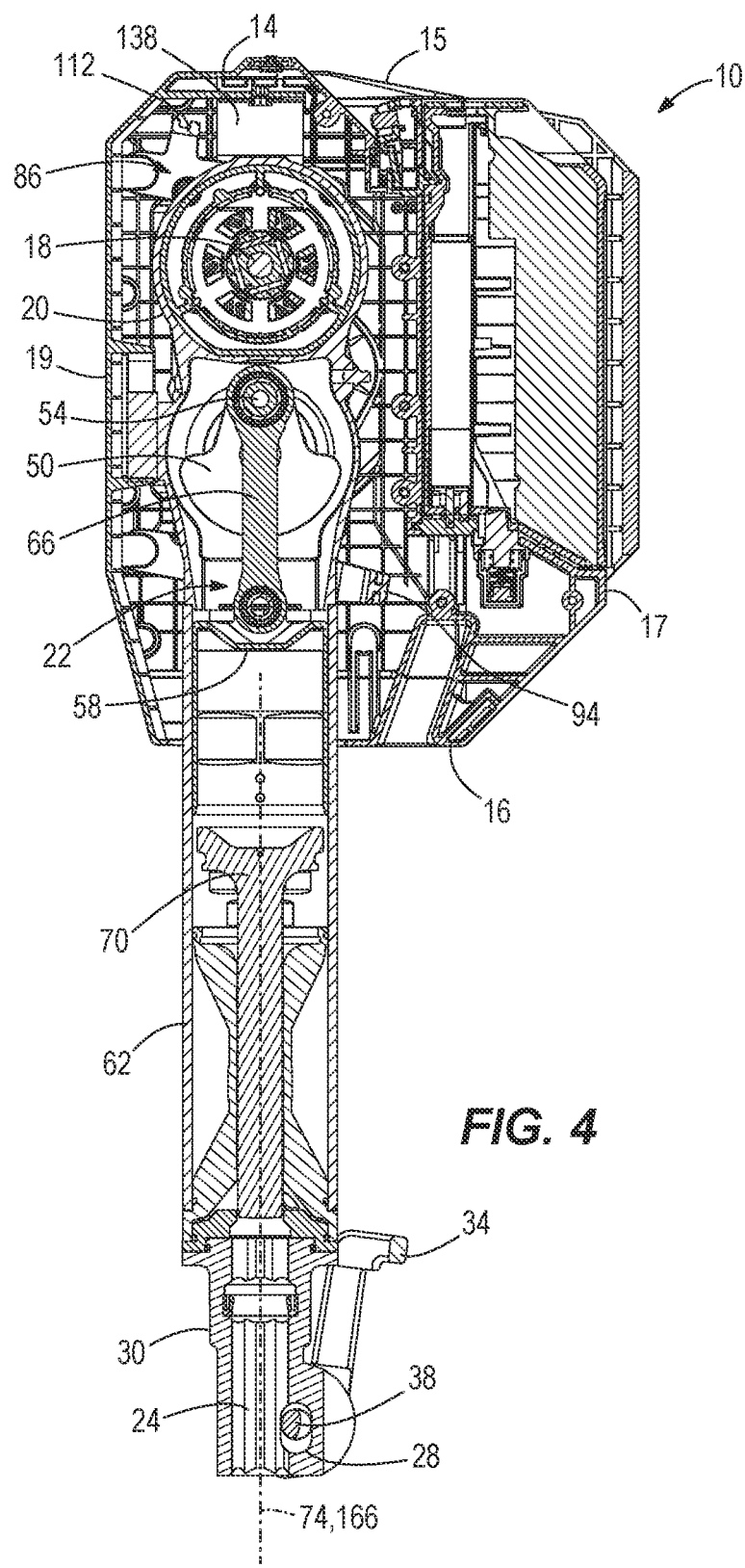
FIG. 4 is a cross-sectional view of the percussion tool of FIG. 1 along section 4-4 in FIG. 1.

With reference to FIG. 3, the breaker 10 includes an anti-vibration system 78 for attenuating vibration in the direction of the striker axis 74. The anti-vibration system 78 includes a linkage 82 coupling the percussion mechanism 22 to the housing 14 to permit relative movement between the housing 14 and the percussion mechanism 22 along the striker axis 74. In the illustrated embodiment, the linkage 82 includes a first swing arm 86, a second swing arm 90, and a third swing arm 94 that pivotally couple and support the crank case 20 with respect to the housing 14. Specifically, the first and second swing arms 86, 90 are respectively coupled to the housing 14 via pivots 98, 102 on opposite internal sides of the housing 14, and are respectively coupled to the crank case 20 via pivots 106, 110. The first and second swing arms 86, 90 are also coupled to each other via a cross bar 112 extending over the crank case 20 on a side opposite the cylinder 62, thus causing the first and second swing arms 86, 90 to swing together. The pivots 98, 102 define a first swing axis 114 about which the swing arms 86, 90 may swing. Unlike the first and second swing arms 86, 90, the third swing arm 94 extends around the crank case 20. The third swing arm 94 is coupled to the housing 14 via pivots 118, 122 on opposite internal sides of the housing 14 and is coupled to the crank case 20 via pivots 126, 130. The pivots 118, 122 define a second swing axis 134 about which the third swing arm 94 may swing. The second swing axis 134 is parallel to the first swing axis 114.

Figure 5:
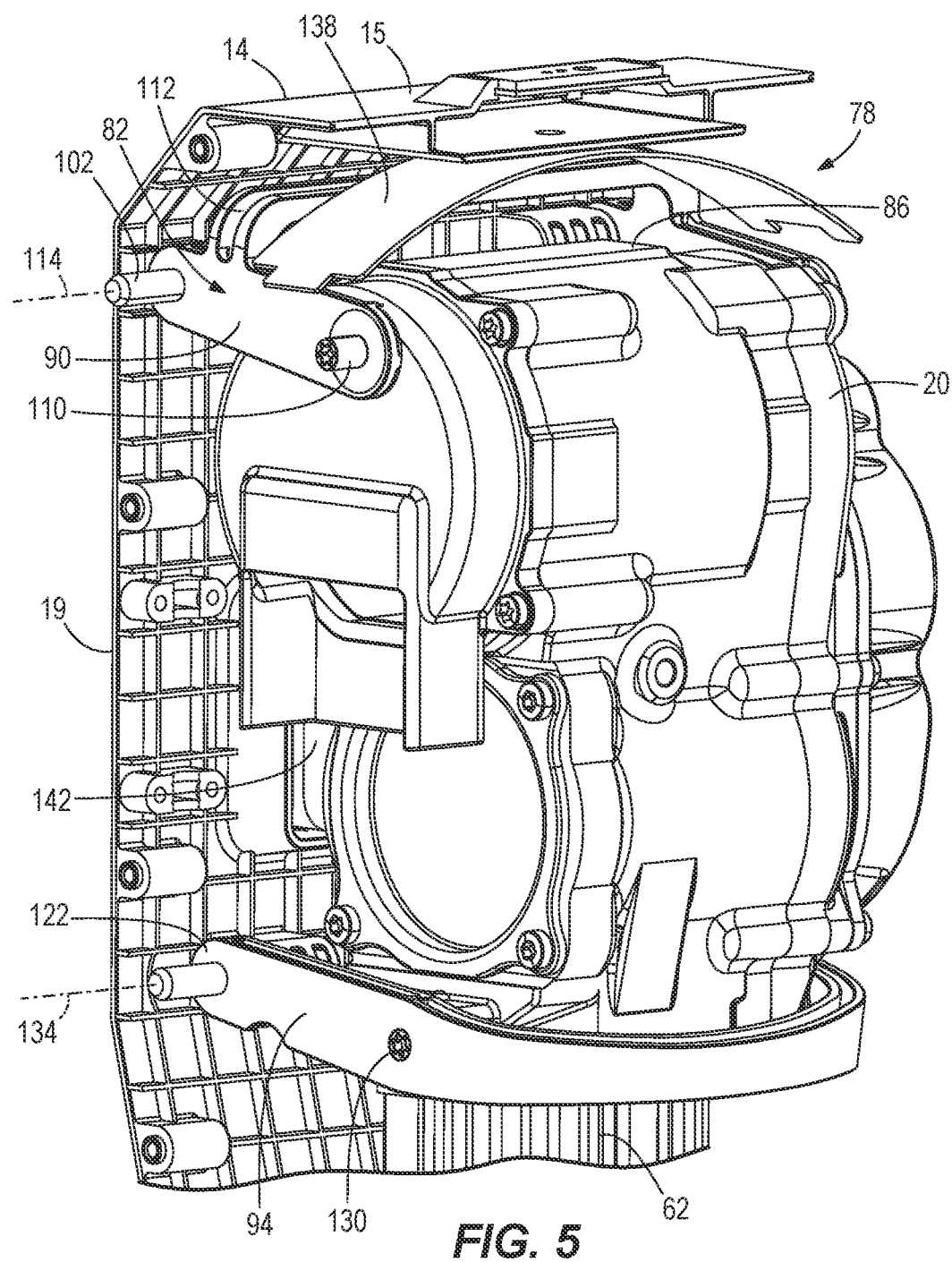
FIG. 5 is a perspective view of the percussion tool of FIG. 1 with portions removed.
Figure 6:
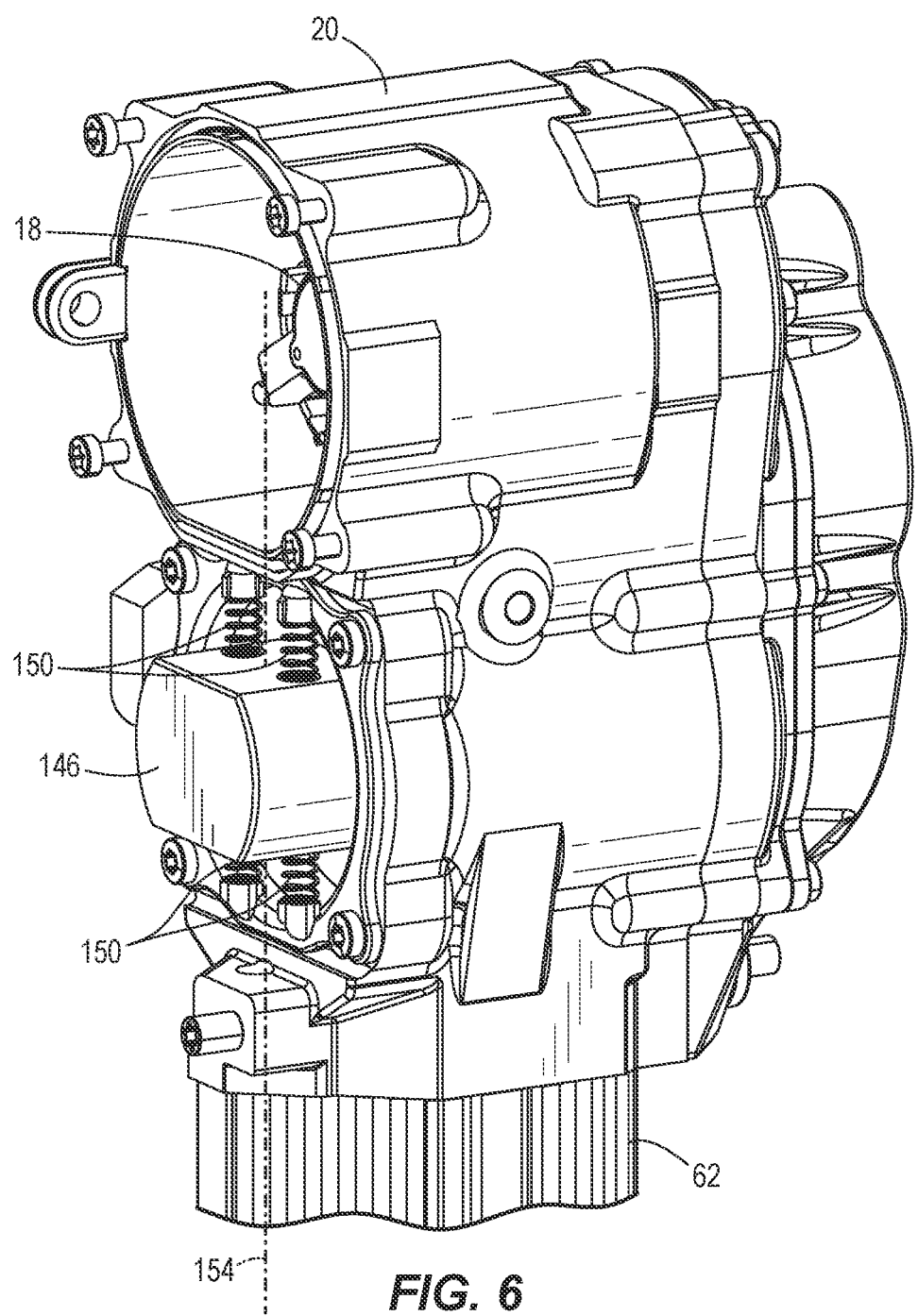
FIG. 6 is a perspective view the percussion tool of FIG. 1 with portions removed.

As shown in FIGS. 3 and 5, the anti-vibration system 78 further includes a leaf spring 138 on the side of the crank case 20 opposite the cylinder 62 and a foam bumper 142 arranged between the housing 14 and the crank case 20 on the side opposite the battery pack 26. The leaf spring 138 is coupled to an interior of the top end 15 of the housing 14 and the foam bumper 142 is coupled to an interior of the rear end of the housing 14. In some embodiments, one portion of the leaf spring 138 is anchored to the housing 14 and another portion is coupled to the crank case 20. As shown in FIG. 6, the anti-vibration system 78 also includes a shake weight, such as a counterweight 146. Four compression springs 150 bias the counterweight 146 along a counterweight axis 154 that is parallel with the striker axis 74. Specifically, in the illustrated embodiment, two of the compression springs 150 are arranged on one side of the counterweight 146 to bias it in a first direction along the counterweight axis 154 and two compression springs 150 are arranged on an opposite side of the counterweight 146 to bias it in an opposite, second direction. The springs 150 are identical, thus biasing the counterweight 146 toward the neutral position shown in FIG. 6. However, in other embodiments there could be just one spring 150 on each side of the counterweight 146, or more than two springs 150.

In the illustrated embodiment, the counterweight 146 is arranged completely within the crank case 20, but in other embodiments, the counterweight 146 could be completely outside the crank case 20 but within housing 14, or partially within the crank case 20. In some embodiments, the mass of the counterweight 146 is between 500 grams and 1,000 grams. The natural frequency of the anti-vibration system 78 is between 20 Hz and 23 Hz, which is the expected operating frequency of the percussion mechanism 22.

Figure 7:
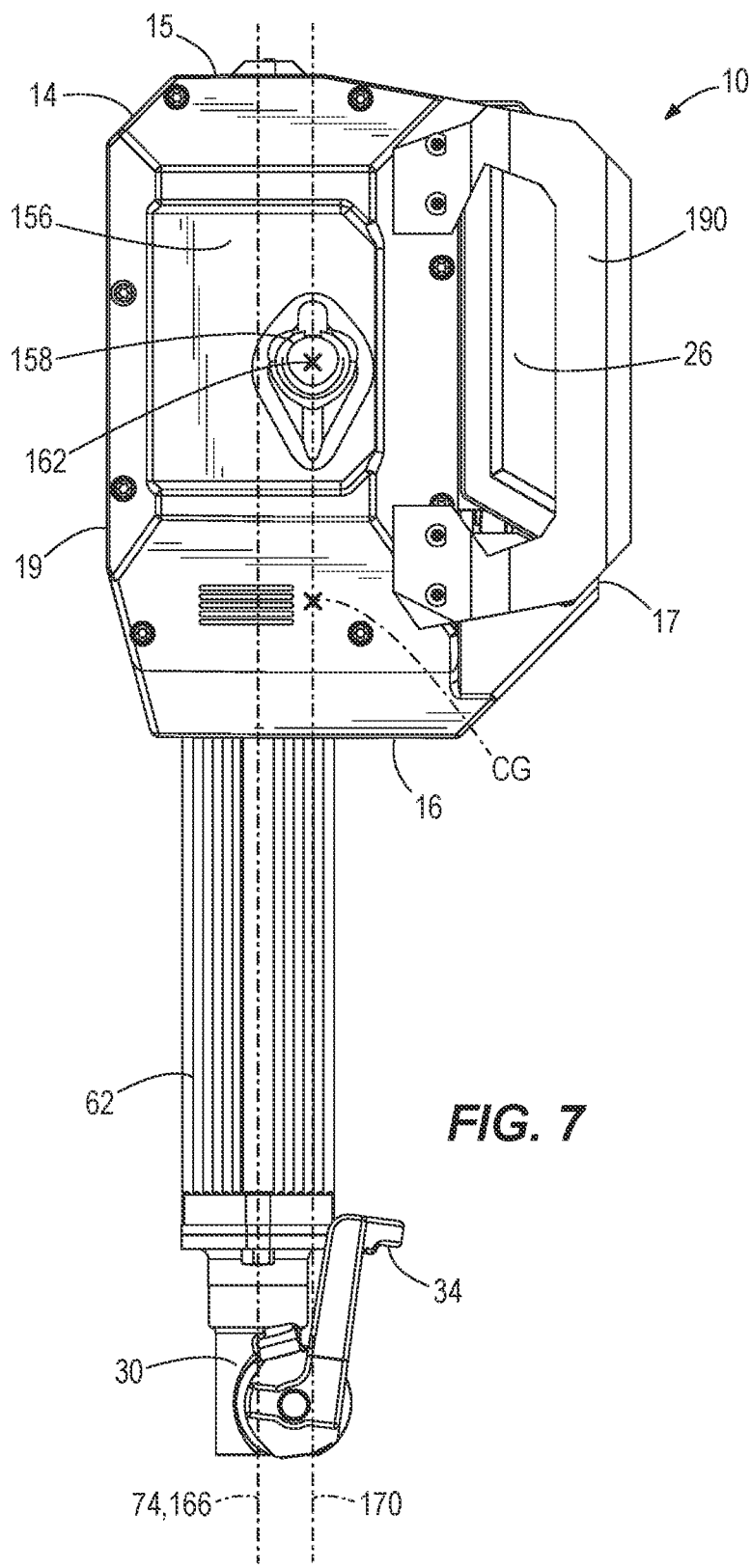
FIG. 7 is a side view of the percussion tool of FIG. 1.

As shown in FIGS. 1 and 7, the housing 14 includes opposite=first and second sides 156, 157 that extend between the front and rear sides 17, 19. The breaker 10 includes opposite first and second operating handles 158, 160 respectively extending from the first and second lateral sides 156, 157 and together defining a second, handle axis 162. The striker axis 74 is contained within a first, striker plane 166 and the handle axis 162 is contained within a second, handle plane 170 that is parallel with the striker plane 166. The striker plane 166 and the battery pack 26 are on opposite sides of the handle plane 170. The handle plane 170 intersects a center of gravity (CG) of the breaker 10, which is forward of the striker plane 166 yet rearward of the battery pack 26 because the battery pack 26 is coupled to the front side 17 of the housing 14. Thus, when an operator picks up the breaker 10 via the first and second handles 158, 160, the cylinder 62 and chisel 24 point straight downward, such that the striker axis 74 can be maintained perpendicular to the ground without the breaker 10 exerting a moment about its center of gravity (CG) that must otherwise be counteracted by the operator.

In other embodiments (not shown), the battery pack 26 may be coupled to the rear side 19 of the housing 14, and the first and second handles 158, 160 are accordingly arranged rearward of the striker plane 166, such that handle plane 170 intersects the (CG) which is also rearward of the striker plane 166. In other embodiments (not shown), the battery pack 26 may be coupled to the top end 15 of the housing 14 (opposite the cylinder 62) and depending on whether the battery pack 26 adds more weight forward of or rearward of the striker plane 166, the first and second handles 158, 160 and the handle plane 170 may be offset of the striker plane 166 accordingly.

Figure 8:
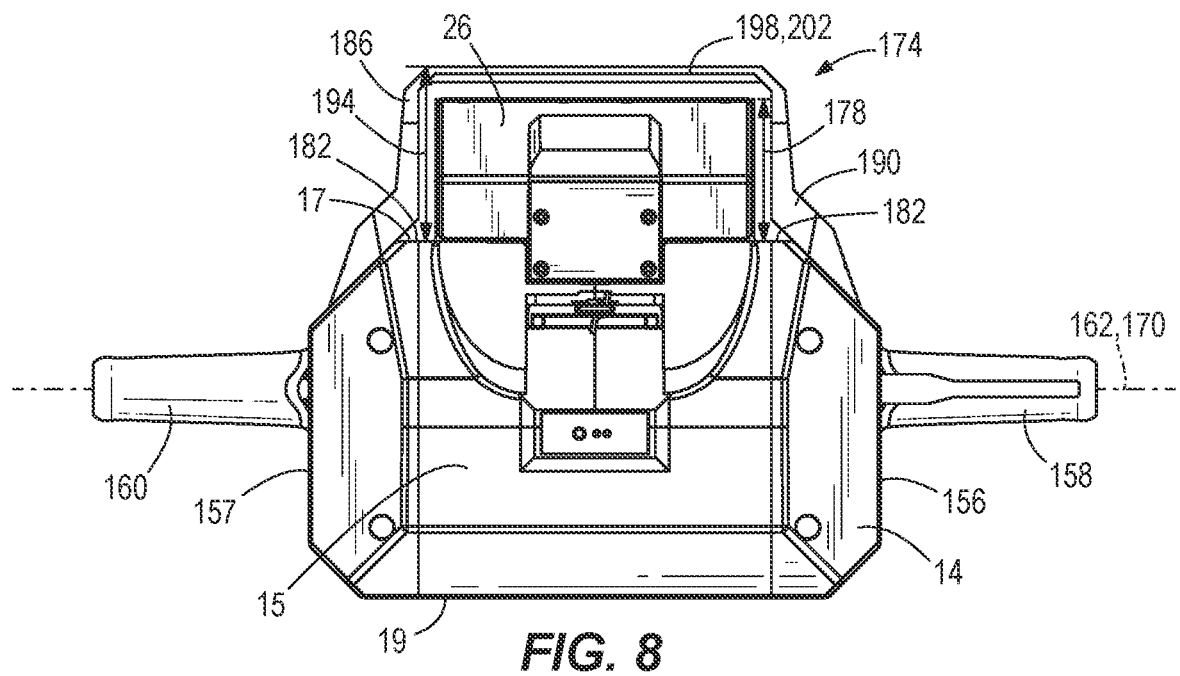
FIG. 8 is a top view of the percussion tool of FIG. 1.

As shown in FIGS. 1 and 8-12, the breaker 10 also includes a guard 174 coupled to the housing 14 and at least partially surrounding the battery pack 26, thereby shielding the surrounded portion of the battery pack 26 from an external impact. As shown in FIG. 8, when the battery pack 26 is coupled to the front side 17 of the housing 14, the battery pack 26 extends a first distance 178 from a surface 182 on the front side 17 of the housing 14. As also shown in FIG. 8, the guard 174 includes a first guard member 186 and a second guard member 190 that both extend a second distance 194 from the surface 182. The first and second guard members 186, 190 are arranged on opposite sides of the battery pack 26 when the battery pack 26 is coupled to the front side 17 of the housing 14.

As shown in FIGS. 1, 8, and 9, a cross member 198 extends between the first and second guard members 186, 190. In the embodiments shown in FIGS. 1 and 8, the cross member 198 is a solid plate 202. However, in another embodiment shown in FIG. 9, the cross member 198 can be one or more bars 206. In still other embodiments shown in FIGS. 10 and 11, there is no cross member between the first and second guard members 186, 190. As shown in FIG. 12, in which the battery pack 26 is removed from the housing 14, and in any of the embodiments described in FIGS. 8-11, the first and second guard members 186, 190 are configured as open rails that define a space 210 within them. In other embodiments, the first and second guard members 186, 190 may be solid without an internal space defined therein.

In operation, an operator first grasps the first and second handles 158, 160 to pick up the breaker 10. As described above, because the handle plane 170 intersects the center of gravity (CG) of the breaker 10, the cylinder 62 and chisel 24 point straight downward, such that the striker axis 74 can be maintained perpendicular to the ground without the breaker 10 exerting a moment about its center of gravity (CG) that must otherwise be counteracted by the operator. This requires the operator to exert less effort when using the breaker 10.

When the motor 18 is activated, the gear train 46 transmits torque from the motor 18 to the crank shaft 50 of the percussion mechanism 22. As the crank shaft 50 rotates, so does the eccentric pin 54. Rotation of the eccentric pin 54 causes the piston 58 to reciprocate within the cylinder 62 via the connecting rod 66, which causes the striker 70 to impart axial blows to the chisel 24, which in turn causes reciprocation of the chisel 24 against a workpiece. Specifically, a variable pressure air pocket (or an air spring) is developed between the piston 58 and the striker 70 when the piston 58 reciprocates within the cylinder 62, whereby expansion and contraction of the air pocket induces reciprocation of the striker 70. The impact of the striker 70 on the chisel 24 causes it to reciprocate for performing work on a surface or workpiece.

In response to the piston 58 and striker 70 reciprocating within the cylinder 62 along the striker axis 74, the counterweight 146 oscillates along the counterweight axis 154, but out of phase with the percussion mechanism 22, to attenuate vibration in the direction of the striker axis 74. In some embodiments, the counterweight 146 reduces the loaded vibration of the breaker 10 by about 10% as compared to vibration of the breaker 10 in embodiments without the counterweight 146.

In response to the piston 58 and striker 70 reciprocating within the cylinder 62, the crank case 20 also experiences vibration along the striker axis 74 as a result of the reaction forces applied to the chisel 24 during operation. As the crank case 20 experiences vibration, the first and second swing arms 86, 90 swing about the first swing axis 114 and the third swing arm swings about the second swing axis 134 to permit the crank case 20 to oscillate along the striker axis 74 with respect to the housing 14, thereby attenuating the vibration transmitted from the crank case 20 to the operator via the housing 14. As the crank case 20 oscillates, the crank case 20 may abut against the leaf spring 138 and the foam bumper 142, which also attenuates the vibration transmitted to the operator through the crank case 20 and housing 14.

If the operator accidentally drops the breaker tool 10 during operation or during an idle, non-operative state, the breaker 10 may fall forward in a direction led by the battery pack 26, which is coupled to the front side 17 of the housing 14. However, instead of the battery pack 26 striking a surface, one or more of the first guard member 186, the second guard member 190, or the cross member 198 of the guard 174 would strike the surface, thereby absorbing the impact of the fall and preventing damage to the battery pack 26.

Figure 13:
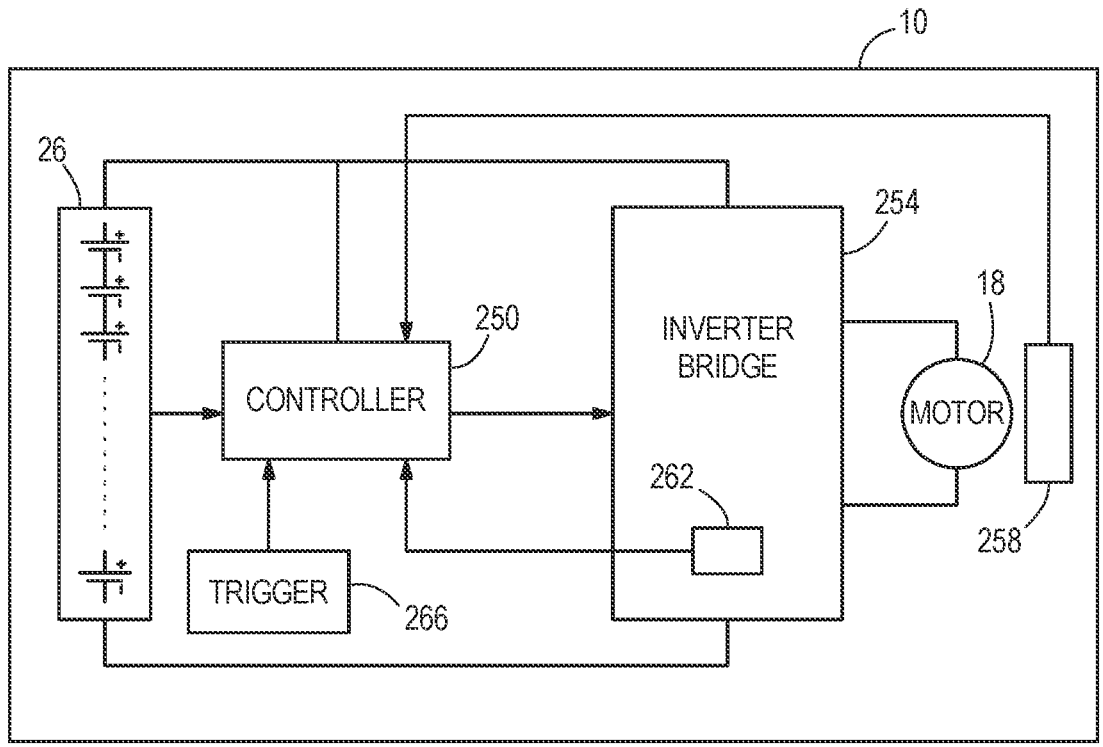
FIG. 13 is a block diagram of the percussion tool of FIG. 1.

FIG. 13 is a simplified block diagram of the breaker 10. In the example illustrated, the breaker 10 includes the battery pack 26, a controller 250 (also referred to as an electronic controller), an inverter bridge 254, the motor 18, a rotational speed sensor 258, one or more current sensors 262, and a trigger 266. The controller 250 includes a memory storing instructions executed by an electronic processor to carry out the functions of the controller 250 described herein. For example, in some embodiments, the controller 250 may be implemented as a microprocessor with a separate memory. In other embodiments, the controller 250 may be implemented as a microcontroller (with memory on the same chip). In other embodiments, the controller 250 may be implemented using multiple processors. In addition, the controller 250 may be implemented partially or entirely as, for example, a field programmable gate array (FPGA), an application specific integrated circuit (ASIC), etc., and the memory may not be needed or be modified accordingly.

The inverter bridge 254 includes a plurality of field effect transistors (FETs) that are used to control the power supply to the motor 18. The controller 250 provides pulse width modulated (PWM) signals to control the FETs of the inverter bridge 254 based on user input. Thereby, the controller 250 may increase or decrease the speed of the motor 18 by increasing or decreasing the duty cycle of the PWM signals.

The rotational speed sensor 258 is provided near or attached to the motor 18 to detect the rotational speed of the motor 18. In some embodiments, the rotational speed sensor 258 may be a Hall-effect sensor that detects an angular position or angular speed of the permanent magnets of the motor 18. The one or more current sensors 262 may be, for example, current sense resistors that provide an indication of an amount of current flowing to the motor 18 to the controller 250. In one example, the breaker 10 includes three current sensors 262, one per each phase of the motor 18. The three current sensors 262 are provided on phase lines connecting the inverter bridge 254 to the motor 18. In some embodiments, the controller 250 communicates with a battery pack controller (not shown) to receive information regarding the battery pack. For example, the controller 250 may receive instantaneous or average values of the battery pack voltage from the battery pack controller.

Although the anti-vibration system 78 is effective in reducing vibrations during a loaded condition, an additional mechanism may be used to reduce vibrations during a no-load condition. The breaker 10 is in a no-load condition when the chisel 24 is not in contact with and/or acting on a work surface or a workpiece. The breaker 10 is in a loaded condition when the chisel 24 is in contact with and acting on a work surface or a workpiece. Generally, the motor 18 operates at a higher speed during a no-load condition in contrast to a loaded condition.

Figure 14:
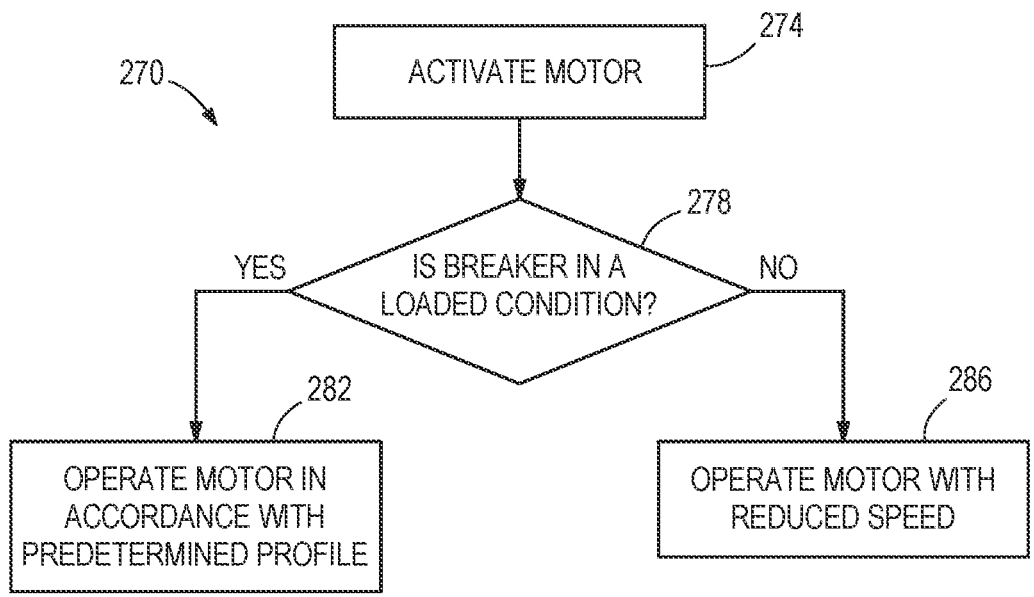
FIG. 14 is a flowchart of a method for reducing vibrations in the percussion tool of FIG. 1.

FIG. 14 is a flowchart illustrating one example method 270 of reducing vibrations in the breaker 10. As illustrated in FIG. 14, the method 270 includes activating, using the controller 250, the motor 18 (at block 274). The motor 18 may be activated in response to a user turning on a power switch or pulling the trigger 266 of the breaker 10. The method 270 also includes determining, using the controller 250, whether the breaker 10 is in a loaded condition (at block 278). Several techniques may be used to detect whether the breaker 10 is in a loaded condition. Exemplary techniques of determining whether the breaker 10 is in a loaded condition based on detecting the motor speed (FIGS. 17 and 19) and detecting current or voltage measurements (FIGS. 18 and 19) are explained below.

In response to the controller 250 determining that the breaker 10 is in a loaded condition, the method 270 includes operating, using the controller 250, the motor 18 in accordance with a predetermined profile (for example, a predetermined speed profile) (at block 282). The predetermined profile may be, for example, a normal loaded condition control of the motor 18. In some embodiments, the controller 250 may provide a constant power output to the motor 18 when the breaker 10 is in the loaded condition and the trigger 266 is depressed. In other embodiments, the controller 250 may vary the speed of the motor 18 in proportion to the actuation amount of the trigger 266 (i.e., when the trigger 266 is a variable speed trigger) when the breaker is in the loaded condition.

When the controller 250 determines that the breaker 10 is in a no-load condition, the method 270 includes operating, using the controller 250, the motor 18 with reduced speed (for example, at a no-load speed) (at block 286). For example, the controller 250 may operate the motor 18 at 50% of maximum speed by driving the inverter bridge 254 with a 50% PWM duty cycle. In some embodiments, the controller 250 may operate the motor 18 at a constant no-load speed that is lower than the speed in the loaded condition when no-load is detected. In other embodiments, in the no-load state, the controller 250 may operate the motor 18 at a speed that is, for example, 50% of the speed that corresponds to the actuation amount of a variable speed trigger. Reducing the speed in the no-load condition further reduces the vibrations experienced by a user of the breaker 10.

In some embodiments, the method 270 continuously loops while the motor 18 is activated (e.g., while the trigger 266 remains depressed). In other words, after proceeding to step 286 and operating the motor with reduced speed and after proceeding to step 282 and operating the motor in accordance with a predetermined profile, the controller 250 returns to step 278 to re-evaluate whether the breaker is in a loaded condition using updated sensor data.

Figure 15:
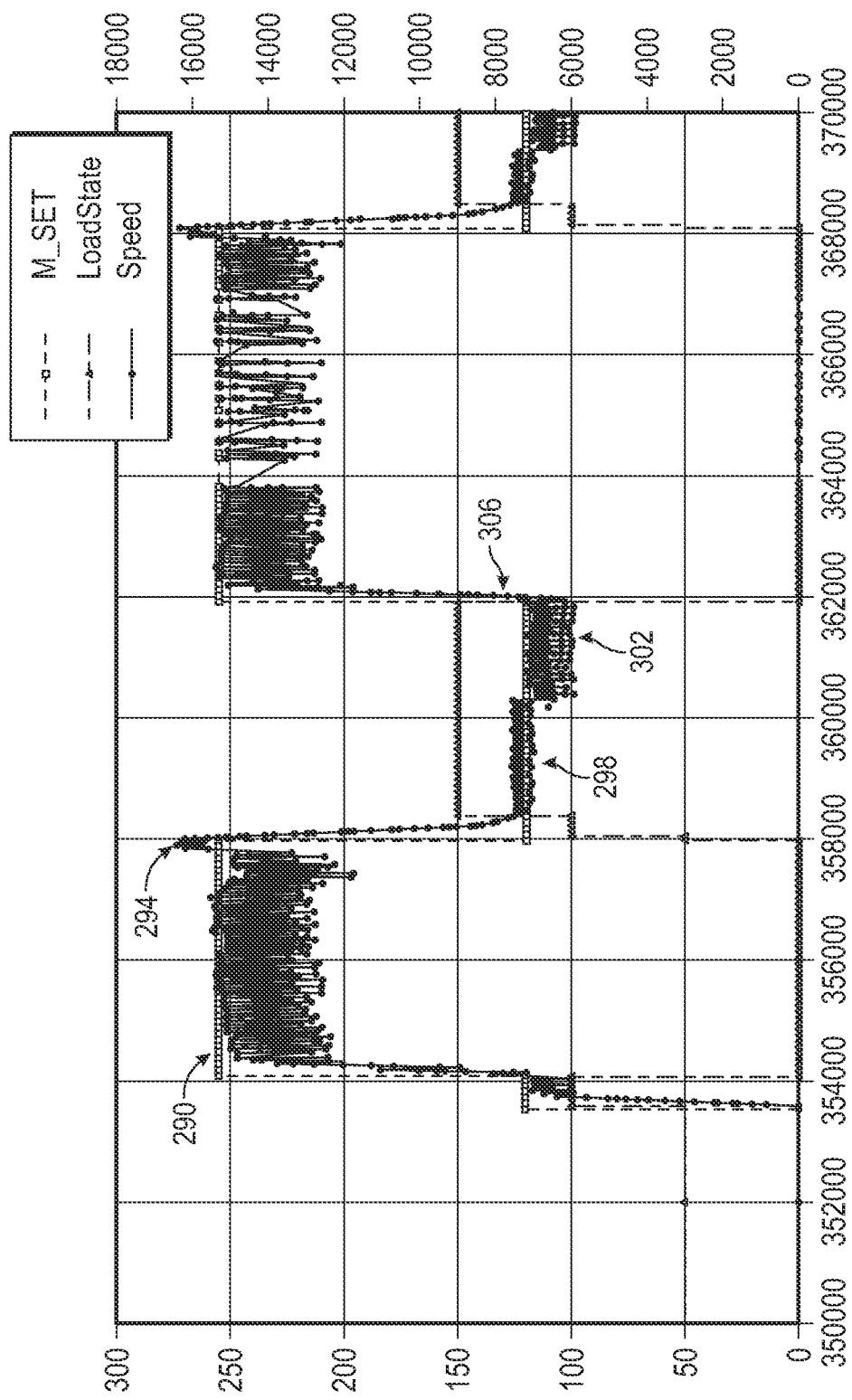
FIG. 15 is a graph illustrating the variation in motor speed in no-load and loaded conditions of the percussion tool of FIG. 1.

FIG. 15 illustrates a graph of motor speed versus time showing the variation in motor speed during no-load and loaded conditions. As shown in FIG. 15, the motor 18 operates in a loaded condition at 290. In the loaded condition, the motor 18 is operated at a maximum power or a power corresponding to a trigger pull. When the breaker 10 is unloaded, for example, at 294, the motor speed increases as the breaker 10 is no longer acting on a workpiece. Additionally, when the breaker 10 is unloaded, for example, at 294, the variation in motor speed decreases. Based on the motor speed and/or variation in motor speed, the controller 250 determines that breaker 10 is in a no-load condition at 294 (e.g., at block 286 of FIG. 14) and reduces the power output to the motor 18 such that the motor can operate at a no-load speed at 298. When the breaker 10 subsequently acts upon a load when under no-load control, for example, at 302, the motor speed decreases due to the tip tool contacting and acting on the workpiece. Additionally, when the breaker 10 acts upon the load, for example, at 302, the variation in motor speed increases. Based on the motor speed and/or variation in motor speed, the controller 250 determines that the breaker 10 is in the loaded condition (e.g., in block 282 of FIG. 14) and switches operation to the loaded mode operation at 306 as described above.

Figure 16:
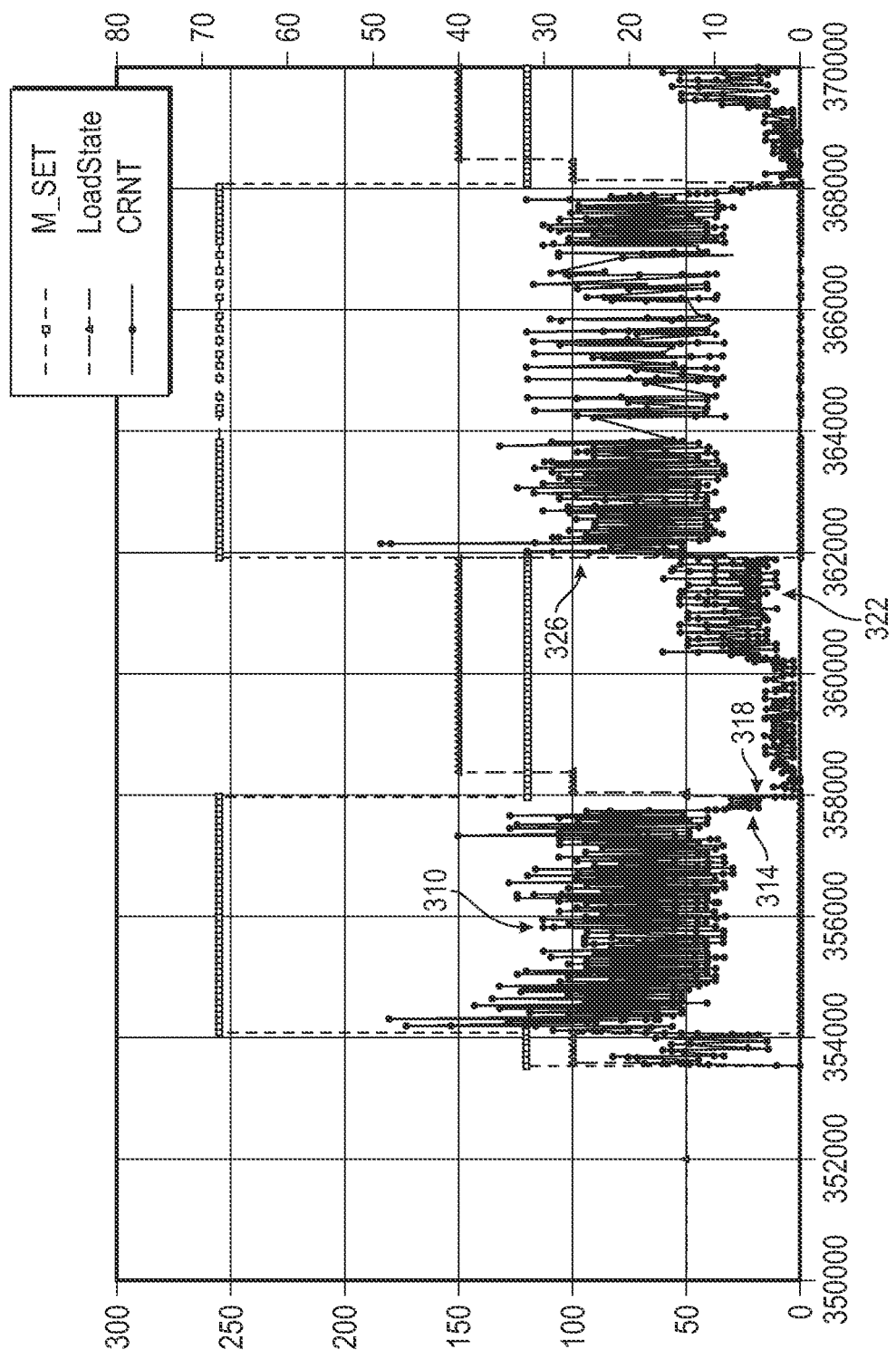
FIG. 16 is a graph illustrating the variation in motor current in no-load and loaded conditions of the percussion tool of FIG. 1.

FIG. 16 illustrates a graph of motor current versus time showing the variation in motor current during no-load and loaded conditions. As shown in FIG. 16, the motor 18 operates in a loaded condition at 310. In the loaded condition, the motor 18 is operated at a maximum power or a power corresponding to a trigger pull. When the breaker 10 is unloaded, for example, at 314, the motor current decreases as the breaker 10 is no longer acting on a workpiece. Additionally, when the breaker 10 is unloaded, for example, at 314, the variation in motor current also decreases. Based on the motor current and/or variation in motor current, the controller 250 determines that breaker 10 is in a no-load condition at 314 (e.g., at block 286 of FIG. 14) and reduces the power output to the motor 18 such that the motor can operate at a no-load speed at 318. When the breaker 10 subsequently acts upon a load when under no-load control, for example, at 322, the motor current increases due to the tip tool contacting and acting on the workpiece. Additionally, when the breaker 10 acts upon the load, for example, at 322, the variation in motor current also increases. Based on the motor current and/or variation in motor current, the controller 250 determines that the breaker 10 is in the loaded condition (e.g., in block 282 of FIG. 14) and switches operation to the loaded mode operation at 326 as described above.

The variation in motor current or speed is determined by calculating, for example, a variance, a standard deviation, a mean, or an average of motor current or speed values over a time period.

Figure 17:
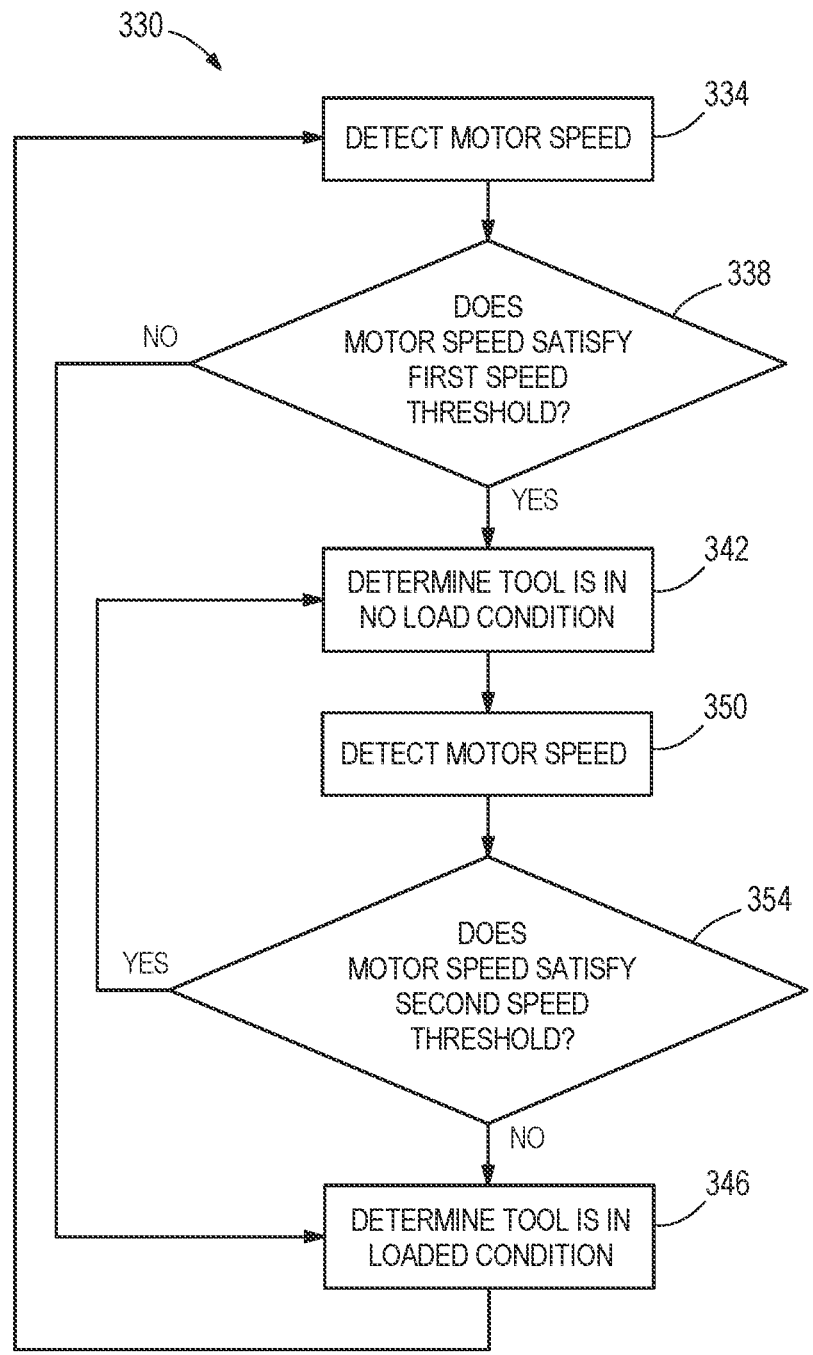
FIG. 17 is a flowchart of a method for determining whether the tool of FIG. 1 is in a no-load condition.

FIG. 17 is a flowchart illustrating one example method 330 for determining whether the breaker 10 is in a no-load condition. As illustrated in FIG. 17, method 330 includes detecting, using the controller 250 with the rotational speed sensor 258, a motor speed (at block 334). In some embodiments, the rotational speed sensor 258 may provide signals indicating the angular speed (i.e., motor speed) of the motor shaft to the controller 250. In other embodiments, the rotational speed sensor 258 may provide an angular position of the motor shaft to the controller 250. In these embodiments, the controller 250 may calculate the motor speed based on the angular positions of the motor shaft. For example, the rotational speed sensor 258 may be a Hall sensor that outputs a pulse to the controller 250 each time a rotor magnet passes across the face of the sensor. For example, the rotational speed sensor 258 may include three Hall sensors each of which outputs a pulse to the controller 250 when the rotor magnet passes across the face of that Hall sensor. The controller 250, in turn, can calculate the speed of the motor by the number of pulses received per time period (e.g., per second). The controller 250 stores the measured speed in a memory. The stored measurements are later used to calculate the average, variance, and other quantities.

The method 330 further includes determining, using the controller 250, whether the motor speed satisfies a first speed threshold (for example, a loaded condition speed threshold) (at block 338). The controller 250 compares the motor speed to the first speed threshold to determine whether the motor speed satisfies the first speed threshold. In some embodiments, the controller 250 may compare an instantaneous motor speed to the first speed threshold. In other embodiments, the controller 250 may compare an average motor speed over a time period to the first speed threshold. For example, the controller 250 may calculate the average motor speed over the past 10 milliseconds or over the past 1 second and compare the average motor speed to the first speed threshold.

In response to the controller 250 determining that the motor speed satisfies the first speed threshold, the controller 250 determines that the breaker 10 is in a no load condition (at block 342). In turn, returning to FIG. 14, the controller 250 then proceeds to reduce the motor speed (see block 286). In response to the controller 250 determining that the motor speed does not satisfy the first speed threshold, the controller 250 determines that the breaker 10 is in a loaded condition (at block 346). In turn, returning to FIG. 14, the controller 250 operates the motor 18 in accordance with a predetermined profile (see block 310).

Once the controller 250 determines that the breaker 10 is in the no-load condition, the controller 250 switches to using a second speed threshold to determine whether a load is subsequently applied to the breaker 10 as described below. The second speed threshold is lower than the first predetermined speed threshold. As described above in FIG. 14, the breaker 10 operates at a reduced speed in the no-load state. As such, the first speed threshold will not be accurate in determining whether a load is subsequently applied. The method 330 includes detecting, using the controller 250 with the rotational speed sensor 258, the motor speed (at block 350). The controller 250 periodically detects the motor speed. For example, the controller 250 may determine the motor speed every few microseconds.

The method 330 also includes determining, using the controller 250, whether the motor speed satisfies the second speed threshold (for example, a no-load condition speed threshold) (at block 354). The controller 250 compares the motor speed to the second speed threshold. In response to the controller 250 determining that the motor speed does not satisfy the second speed threshold, the controller 250 determines that the breaker 10 is in the loaded condition (at block 346). Once the controller 250 determines that the breaker 10 is in the loaded condition, the controller 250 returns to step 334 and switches back to comparing the motor speed to the first speed threshold to determine whether the breaker 10 is subsequently unloaded. In response to the controller 250 determining that the motor speed satisfies the second predetermined speed threshold, the method 330 returns to block 342 to determine that the breaker 10 is in the no load condition as described above.

In the above example, the motor speed satisfies the first speed threshold or the second speed threshold when the motor speed exceeds the first speed threshold or the second speed threshold respectively. The motor speed does not satisfy the first speed threshold or the second speed threshold when the motor speed is below the first speed threshold or the second speed threshold respectively. In other examples, the motor speed satisfies the first speed threshold or the second speed threshold when the motor speed falls below the first speed threshold or the second speed threshold respectively. The motor speed does not satisfy the first speed threshold or the second speed threshold when the motor speed is above the first speed threshold or the second speed threshold respectively.

Figure 18:
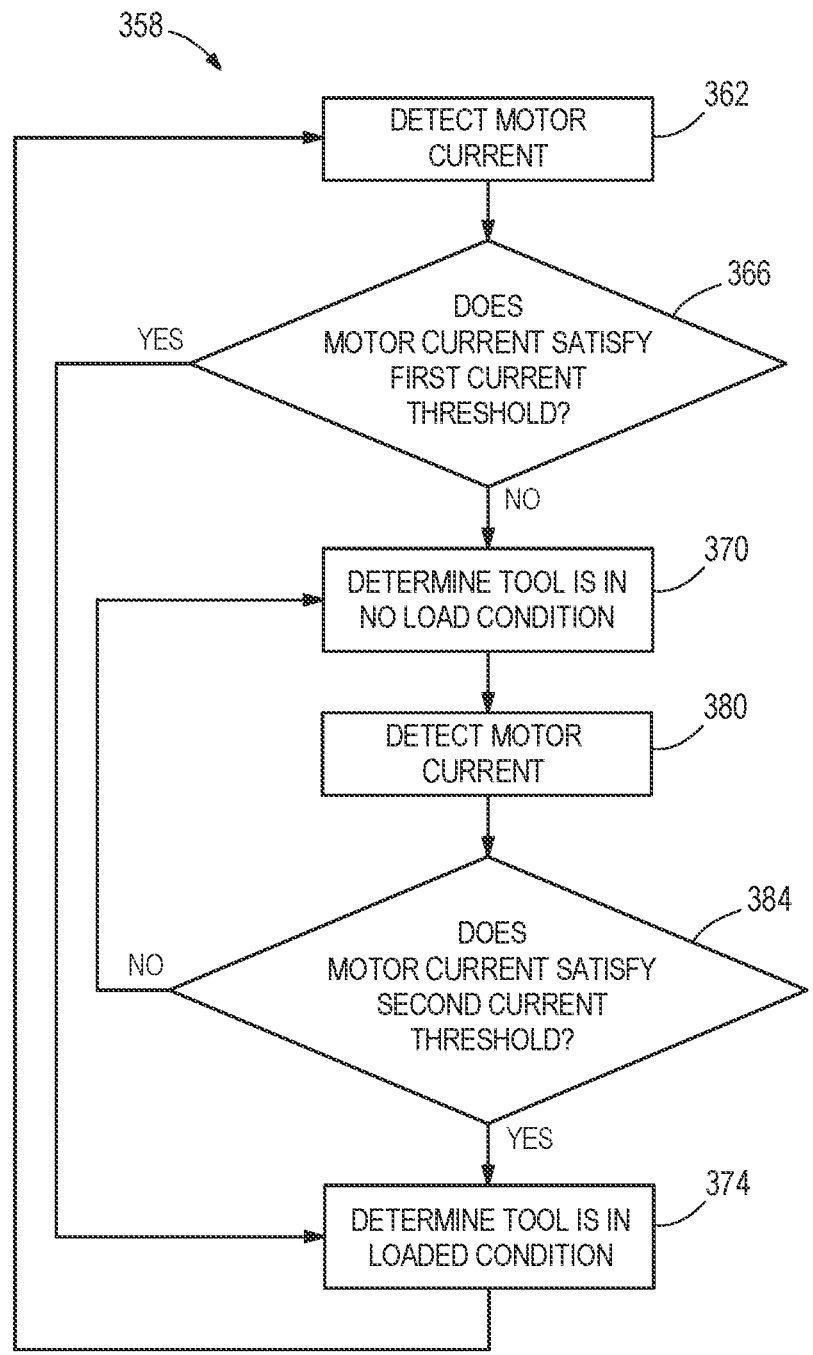
FIG. 18 is a flowchart of another method for determining whether the tool of FIG. 1 is in a no-load condition.

FIG. 18 is a flowchart illustrating another example method 358 of determining whether the breaker 10 is in a no-load condition. As illustrated in FIG. 18, the method 358 includes detecting, using the controller 250 with the one or more current sensors 262, a motor current (at block 362). As described above, the one or more current sensors 262 may be a current sense resistor that provides an indication of an amount of current flowing to the motor 18 to the controller 250. In some embodiments, the amount of expected motor current in a load and no-load condition may vary based on the voltage of the battery pack 26. In these embodiments, the controller 250 may use the battery pack voltage measurement to weight the measured current values. For example, when the battery pack 26 has a first, higher voltage (e.g., when fully charged), the expected motor current in a loaded and no-load condition may be higher than when the battery pack 26 has a second, lower voltage (e.g., after the battery pack is partially drained through usage of the breaker 10). Accordingly, the controller 250 may determine the battery pack voltage in block 350, and weight the detected current by multiplying the detected current by a value inversely proportional to the voltage of the battery pack 26. In some embodiments, the controller 250 may also weight the measured current values based on a historical values of motor current (for example, based on how the current has been performing in the past for a certain condition). Thus, in some embodiments, the detected motor current in step 350 is an adjusted current weighted based on the voltage of the battery pack 26 or past current performance. Detected motor speed and detected motor speed variation may be similarly weighted based on the voltage of the battery pack 26 or the past speed performance. Alternatively, in another embodiment, the voltage of the battery pack 26 or the past motor performance is used to adjust the motor speed thresholds (that is, the first speed threshold and the second speed threshold), the motor speed/current variation threshold (described below with respect to FIG. 19), and/or a motor current thresholds (that is, a first current threshold and a second current threshold as described below). For example, the motor speed thresholds, the motor speed/current variation threshold, and/or the motor current thresholds are multiplied by a value inversely proportional to the voltage of the battery pack 26. The controller 250 stores the measured current values in a memory. The stored measurements are later used to calculate the average, variance, and other quantities.

The method 358 further includes determining, using the controller 250, whether the motor current satisfies a first current threshold (for example, a loaded condition current threshold) (at block 366). The controller 250 compares the motor current or the updated motor current to the first current threshold to determine whether the motor current satisfies the first current threshold. In some embodiments, the controller 250 may compare an instantaneous motor current to the first current threshold. In other embodiment, the controller 250 may compare an average motor current over a time period to the first current threshold. For example, the controller 250 may calculate the average motor current over the past 10 milliseconds or over the past 1 second and compare the average motor current to the first current threshold.

In response to the controller 250 determining that the motor current does not satisfy the first current threshold, the controller 250 determines that the breaker 10 is in a no-load condition (at block 370). In response to the controller 250 determining that the motor current satisfies the first current threshold, the controller 250 determines that the breaker 10 is in a loaded condition (at block 374).

Once the controller 250 determines that the breaker 10 is in the no-load condition, the controller 250 switches to using a second current threshold to determine whether a load is subsequently applied to the breaker 10 as described below. The second current threshold is lower than the first current threshold. The method 358 includes detecting, using the controller 250 with the one or more current sensors 262, the motor current (at block 380). The controller 250 periodically detects the motor current. For example, the controller 250 may determine the motor current every few microseconds.

The method 358 also includes determining, using the controller 250, whether the motor current satisfies the second current threshold (for example, a no-load condition current threshold) (at block 384). The controller 250 compares the motor current to the second current threshold. In response to the controller 250 determining that the motor current satisfies the second current threshold, the controller 250 determines that the breaker 10 is in a loaded condition (at block 374). Once the controller 250 determines that the breaker 10 is in the loaded condition, the method 290 switches back to comparing the detected current to the first current threshold to determine whether the breaker 10 is subsequently unloaded. In response to the controller 250 determining that the motor current does not satisfy the second current threshold, the controller 250 determines that the breaker 10 is in a no load condition (at block 370) as described above. In some embodiments, the motor current, the first current threshold and/or the second current threshold is adjusted based on the voltage of the battery pack 26 or historical current performance as described above.

In the above example, the motor current satisfies the first current threshold or the second current threshold when the motor current exceeds the first current threshold or the second current threshold respectively. The motor current does not satisfy the first current threshold or the second current threshold when the motor current is below the first current threshold or the second current threshold respectively. In other examples, the motor current satisfies the first current threshold or the second current threshold when the motor current falls below the first current threshold or the second current threshold respectively. The motor current does not satisfy the first current threshold or the second current threshold when the motor current is above the first current threshold or the second current threshold respectively.

In some embodiments, hysteresis may be used to prevent frequent switching between the different operations of the breaker 10. For example, instead of two thresholds of different values, a single initial threshold may be used, but updated to provide hysteresis when the controller 250 determines that the tool has changed from a loaded condition to a no-load condition, and vice-versa. More particularly, when the tool is in a no-load condition and the controller 250 determines that the current has satisfied the threshold in step 384, the controller 250 proceeds to block 374 to determine that the breaker 10 is now in a loaded condition. Upon entering block 374, the controller 250 also reduces the threshold (e.g., to a value between 60-90% of the initial predetermined threshold). This reduced threshold may be used by the controller when subsequently executing step 366. In some embodiments, this reduced threshold is used for a certain amount of time or number passes through block 366, and then the controller 250 returns the threshold to its initial value. Similarly, when the tool is in a loaded condition and the controller 250 determines that the current no longer satisfies the threshold in step 366, the controller 250 proceeds to block 370 to determine that the breaker 10 is now in a no-load condition. Upon entering block 370, the controller 250 also increases the threshold (e.g., to a value between 110-140% of the initial threshold). This increased threshold may be used by the controller when subsequently executing step 384. In some embodiments, this increased threshold is used for a certain amount of time or number passes through block 384, and then the controller 250 returns the threshold to its initial value. In some embodiments, to provide hysteresis, the controller 250 may turn off determining whether the current has satisfied a threshold for a certain amount of time. For example, the controller 250 may implement a timer after switching from the loaded condition to the no-load condition or from the no-load condition to the loaded condition before the controller 250 next determines whether the current satisfies the threshold value.

Figure 19:
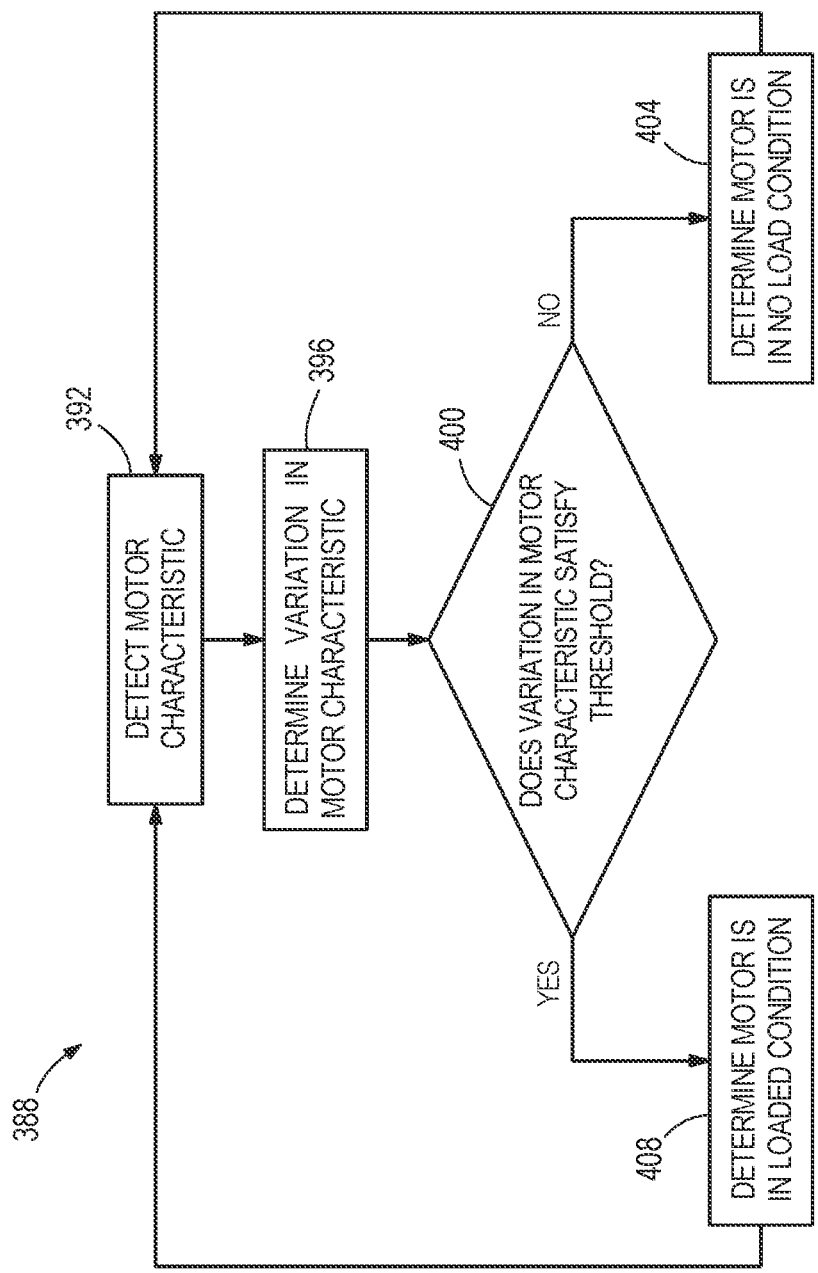
FIG. 19 is a flowchart of another method for determining whether the tool of FIG. 1 is in a no-load condition.

FIG. 19 is a flowchart illustrating another example method 388 of determining whether the breaker 10 is in a no-load condition. As illustrated in FIG. 19, the method 388 includes detecting, using the controller 250 with a sensor, a motor characteristic (at block 392). The motor characteristic is, for example, the motor speed, the motor current, a voltage provided to the motor, or the like. The controller 250 uses one or more sensors to detect the motor characteristic. For example, the controller 250 uses rotational speed sensor 258 to determine the motor speed and uses the one or more current sensors 262 to determine the motor current.

The method 388 further includes determining, using the controller 250, a variation in the motor characteristic (at block 396) over a time period. The time period may be, for example, 10 milliseconds or 1 second. In some embodiments, determining the variation includes calculating, for example, a variance, a standard deviation, a mean, an average, or the like of the motor characteristic values over the time period. The variance in the motor characteristic is calculated by averaging the squared difference of each sample of motor characteristic value from a mean motor characteristic value within the time period. For example, the controller 250 determines a variation in motor speed, motor current, or the like. As described above, the controller 250 stores speed and current measurements in a memory to calculate the variation over a given period of time.

The method 388 also includes determining, using the controller 250, whether the variation in motor characteristic satisfies a characteristic variation threshold (at block 354). The controller 250 compares the variation in motor characteristic to the characteristic variation threshold. In one example, the controller 250 compares the variance in motor speed to a speed variance threshold. In another example, the controller 250 compares the variance in motor current to a current variance threshold. In response to the controller 250 determining that the variance in motor characteristic does not satisfy the predetermined characteristic variance threshold, the controller 250 determines that the breaker 10 is in the no-load condition (at block 404). In turn, returning to FIG. 14, the controller 250 then proceeds to reduce the motor speed (see block 286).

In response to the controller 250 determining that the motor characteristic satisfies the characteristic variation threshold, the controller 250 determines that the breaker 10 is in the loaded condition (at block 408). In turn, returning to FIG. 14, the controller 250 operates the motor 18 in accordance with a predetermined profile (see block 310).

In the above example, the motor characteristic satisfies the characteristic variation threshold when the motor characteristic exceeds the characteristic variation threshold and the motor characteristic does not satisfy the characteristic variation threshold when the motor characteristic is below the characteristic variation threshold. In other examples, the motor characteristic satisfies the characteristic variation threshold when the motor characteristic falls below the characteristic variation threshold and the motor characteristic does not satisfy the characteristic variation threshold when the motor characteristic is above the characteristic variation threshold respectively.

In some embodiments, rather than the motor characteristic variation, the controller 250 may use other motor characteristic profiles to determine whether the breaker is in a loaded condition or a no-load condition. Other characteristic profiles may include, for example, a motor characteristic curve (e.g., motor speed curve, motor current curve) or the like. In these embodiments, the controller 250 measures the motor characteristic values over a time period and determines a measured characteristic profile based on the measured motor characteristic values. The controller 250 compares the measured characteristic profile to a known characteristic profile that is stored in a memory of the controller 250. Similar to the above described examples, the controller 250 determines whether the breaker is in a loaded condition or a no-load condition based on comparing the measured characteristic profile to the known characteristic profile. For example, when the measured characteristic profile varies from the known characteristic profile by more than a particular amount (i.e., the measured characteristic satisfies the known characteristic profile), the controller 250 determines that the breaker is loaded (or in a no-load condition, depending on the embodiment). As another example, when the measured characteristic profile varies from the known characteristic profile by less than a particular amount (i.e., the measured characteristic profile does not satisfy the known characteristic profile), the controller 250 determines that the breaker is loaded (or in a no-load condition, depending on the embodiment).

After proceeding to step 404 and operating the motor with reduced speed and after proceeding to step 408 and operating the motor in accordance with a predetermined profile, the controller 250 returns to step 392 to re-evaluate whether the breaker is in a loaded condition using updated sensor data. That is, the controller 250 continuously detects the motor characteristic and updates the variation in motor characteristic or the measured characteristic profile to determine the load state of the breaker 10.

As illustrated in FIGS. 15 and 16, the motor speed and motor current vary to a larger degree when the breaker 10 is loaded than when the breaker 10 is unloaded. The method 388 detects the variation in the motor characteristic to determine a load condition of the breaker 10. In some embodiments, hysteresis may be used to prevent frequent switching between the different operations of the breaker 10. For example, the threshold may be updated to provide hysteresis after step 400 when the controller 250 determines that the tool has changed from a loaded condition to a no-load condition, and vice-versa. More particularly, when the tool is in a no-load condition and the controller 250 determines that the variation has satisfied the threshold in step 400, the controller 250 proceeds to block 408 to determine that the breaker 10 is now in a loaded condition. Upon entering block 408, the controller 250 also reduces the threshold (e.g., to a value between 60-90% of the initial threshold). This reduced threshold may be used by the controller when subsequently executing step 396. In some embodiments, this reduced threshold is used for a certain amount of time or number passes through block 396, and then the controller 250 returns the threshold to its initial value. Similarly, when the tool is in a loaded condition and the controller 250 determines that the variation has not satisfied the threshold in step 400, the controller 250 proceeds to block 404 to determine that the breaker 10 is now in a no-load condition. Upon entering block 404, the controller 250 also increases the threshold (e.g., to a value between 110-140% of the initial threshold). This increased threshold may be used by the controller when subsequently executing step 396. In some embodiments, this increased threshold is used for a certain amount of time or number passes through block 396, and then the controller 250 returns the threshold to its initial value. In some embodiments, to provide hysteresis, the controller 250 may turn off determining whether the characteristic value has satisfied a threshold for a certain amount of time. For example, the controller 250 may implement a timer after switching from the loaded condition to the no-load condition or from the no-load condition to the loaded condition before the controller 250 next determines whether the characteristic value satisfies the threshold value.

Alternatively, the method 388 may be modified to resemble methods 330 and 358 such that a first characteristic variation threshold (or first known characteristic profile) is used to determine load state in the loaded condition and a second characteristic variation threshold (or second known characteristic profile) is used to determine load state in the unloaded (or no load) condition.

Figure 20:
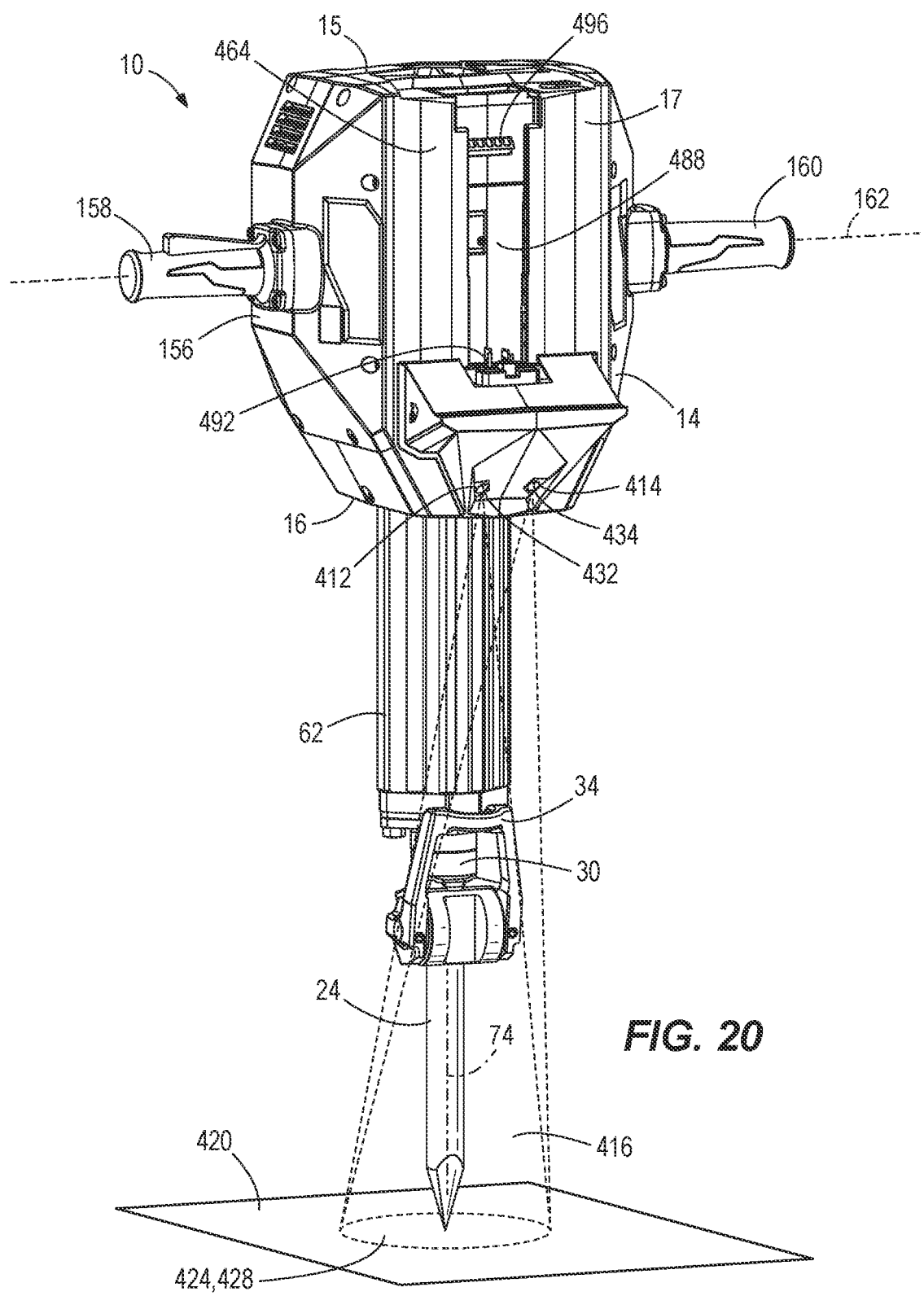
FIG. 20 is a perspective view of a percussion tool according to another embodiment of the invention.

As shown in FIG. 20, in some embodiments the breaker 10 includes one or more light sources 412, 414. In the illustrated embodiment, two light sources 412, 414 are located on the front side 17 of the housing 14. Alternatively, the breaker 10 may include more or fewer light sources 412, 414, and the light sources 412, 414 could be located elsewhere (e.g., on the bottom end 16 of the housing 14 or on the cylinder 62). The light sources 412, 414 emit light 416 that illuminates a workpiece 420 on which the above-described chiseling operation is performed. The light 416 projects an incident area 424 on the workpiece 420 having a surface area 428. In the illustrated embodiment, the incident area 424 is circular, but in other embodiments, the incident area 424 may take other shapes. In the illustrated embodiment, when viewing the breaker 10 from the front side, the first light source 412 is offset from and located on a first side of the chisel axis 74 and the second light source 414 is offset from and located on an opposite second side of the chisel axis 74.

In some embodiments, the one or more light sources 412, 414 are spot lights. In other embodiments, the one or more light sources 412, 414 are flood lights. In some embodiments, one light source 412 is a spot light and one light source 414 is a flood light. In some embodiments, the one or more light sources 412, 414 are LEDs. In some embodiments, the breaker 10 includes a pair of lenses 432, 434 through which light produced by the light sources 412, 414 respectively is respectively projected. In some embodiments, the lens may be adjusted to diffuse the light 416 and thereby increase the surface area 428 of the incident area 424. In some embodiments, the lens may be adjusted to narrow the focus of the light 416 on the workpiece contacted by the chisel 24, thereby decreasing the surface area 428. The light 416 produced by the one or more light sources 412, 414 makes it easier for an operator to monitor the chiseling operation on the workpiece 420, particularly in low light conditions.

Figure 22:
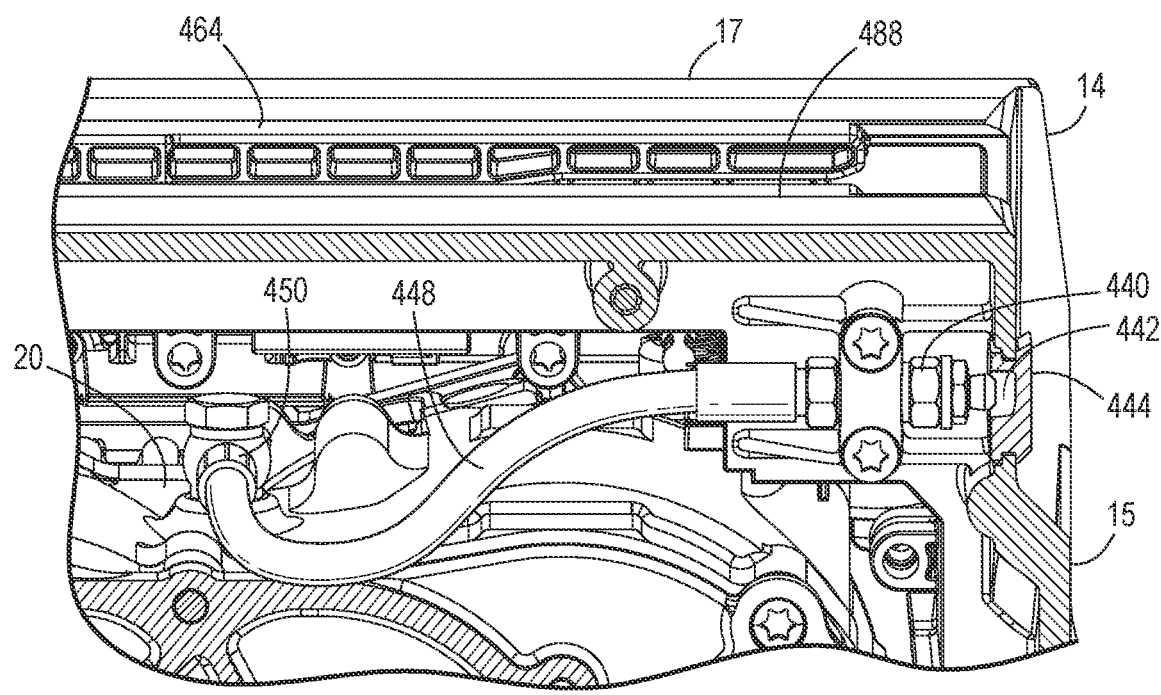
FIG. 22 is a cross-sectional view of the percussion tool of FIG. 20.

In some embodiments, the breaker 10 includes a lubricant (e.g., Zerk) fitting 440 proximate the top end 15 of the housing 14 (FIG. 22). The Zerk fitting 440 is arranged in an opening 442 on the top side 15 of the housing 14 that is covered by a selectively removable cover 444 as shown in FIG. 22. A tube 448 connects the Zerk fitting 440 to a crank fitting 450 on the crank case 20 that provides a fluid coupling to the crank case 20 and the percussion mechanism 22 therein. The Zerk fitting 440 provides access for an operator to supply grease or another lubricant to the percussion mechanism 22 via the tube 448 and crank fitting 450. Because the Zerk fitting 440 is arranged proximate the top end 15 of the housing 14, which the operator is able to access with convenience, the Zerk fitting 440 is conveniently located for an operator to supply grease to the percussion mechanism 22 without removing the crank case 20 from the housing 14.

Figure 23:
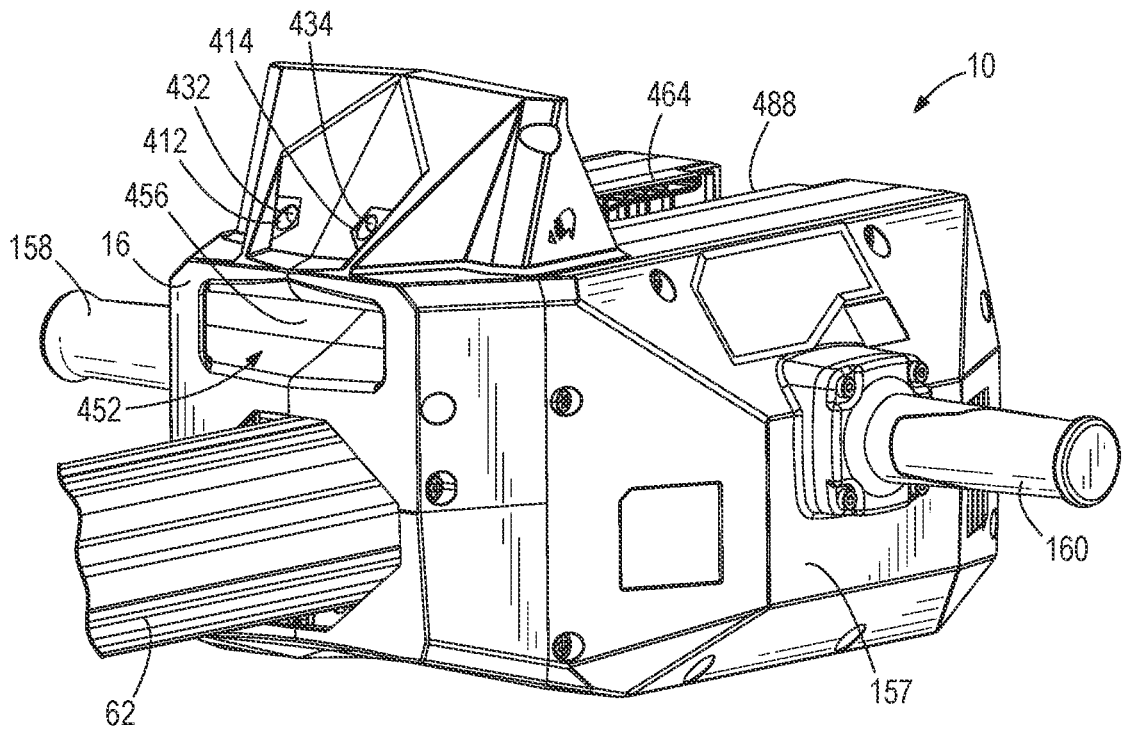
FIG. 23 is a perspective view of the percussion tool of FIG. 20.
Figure 24:
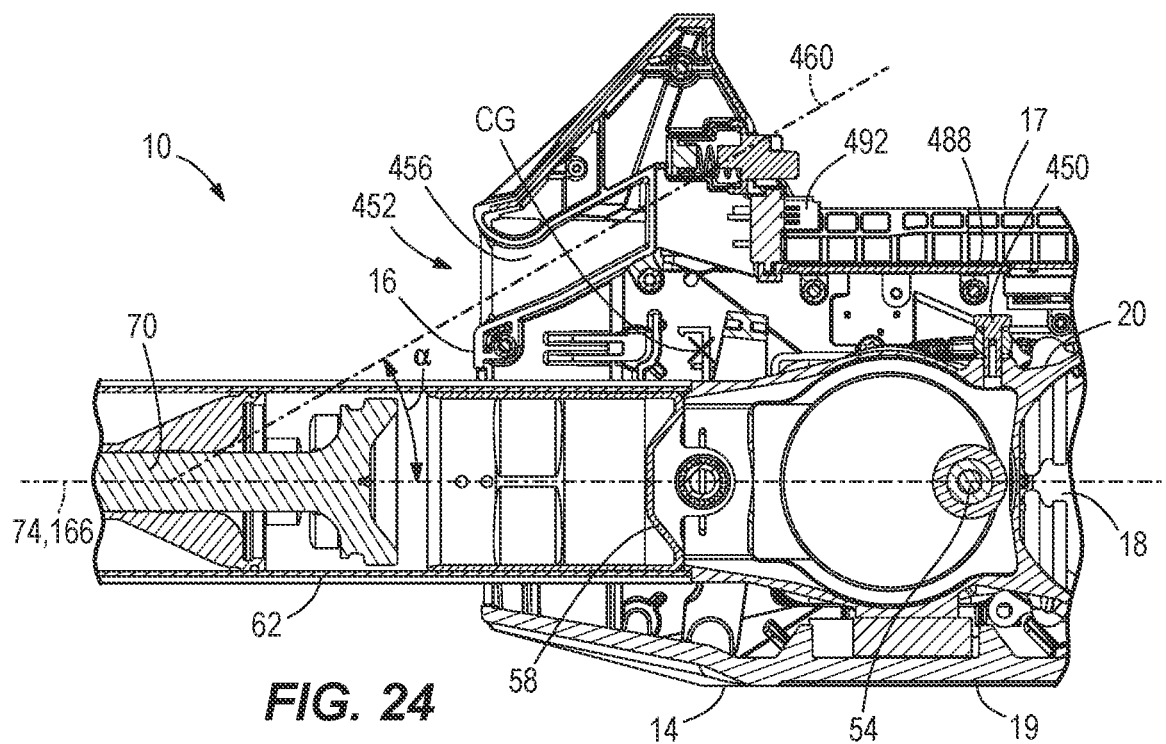
FIG. 24 is a cross-sectional view of the percussion tool of FIG. 20.

As shown in FIGS. 23 and 24, the bottom end 16 of the housing 14 includes a carrying handle 452 on the bottom end 16 of the housing 14 and configured to be grasped during a non-operative state of the breaker 10. In the embodiment illustrated in FIGS. 23 and 24, the carrying handle 452 is a recess 456 in the bottom end 16 of the housing 14. The recess 456 substantially defines a handle plane 460 that defines an acute angle α with respect to the striker plane 166. In some embodiments, the angle α is between 5 degrees and 60 degrees. In the illustrated embodiment, the angle α is approximately 30 degrees. The relative orientation between the recess 456 and the striker plane 460 makes the operator's grip more secure when the operator slides a hand into the recess 456. In some embodiments, the recess 456 is molded into the bottom end 16 of the housing 14. Because the handle 452 is proximate the center of gravity CG of the breaker 10 (FIG. 24), when an operator grasps the handle 452, the breaker 10 is less likely to wobble or create a moment that might otherwise cause the breaker 10 to tip in any particular direction, making the breaker 10 more stable (and thus more comfortable for the user) when being carried to and from a job site.

Figure 21:
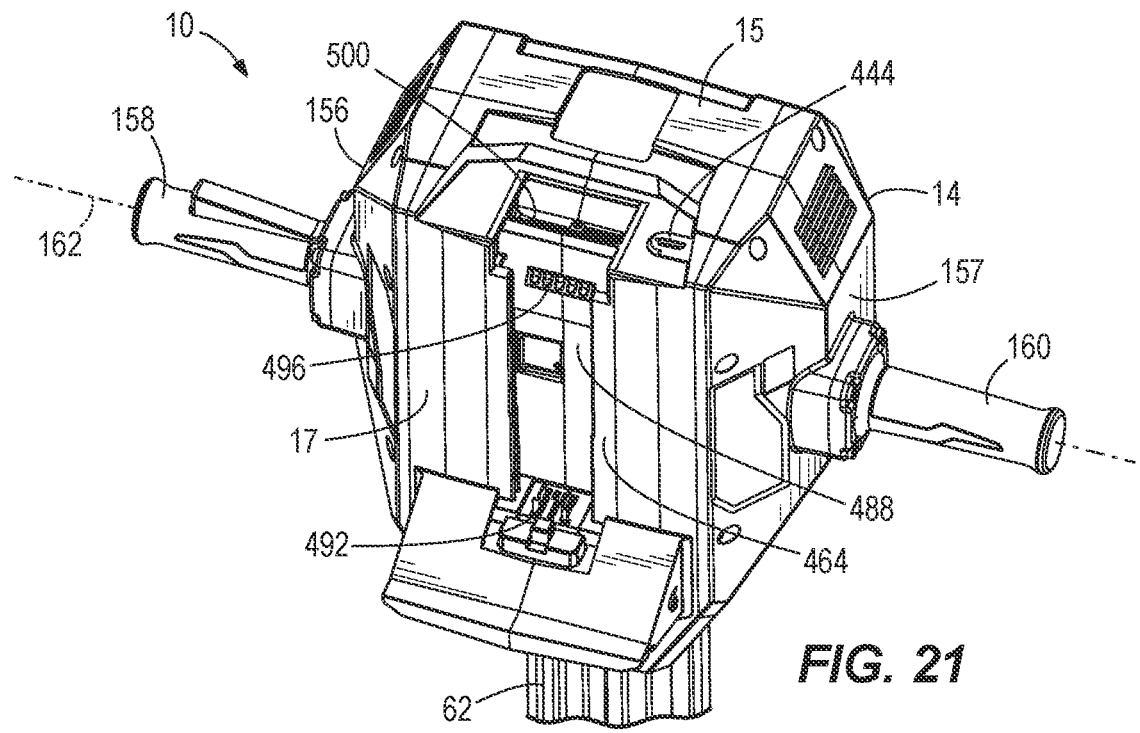
FIG. 21 is a perspective view of the percussion tool of FIG. 20.
Figure 26:
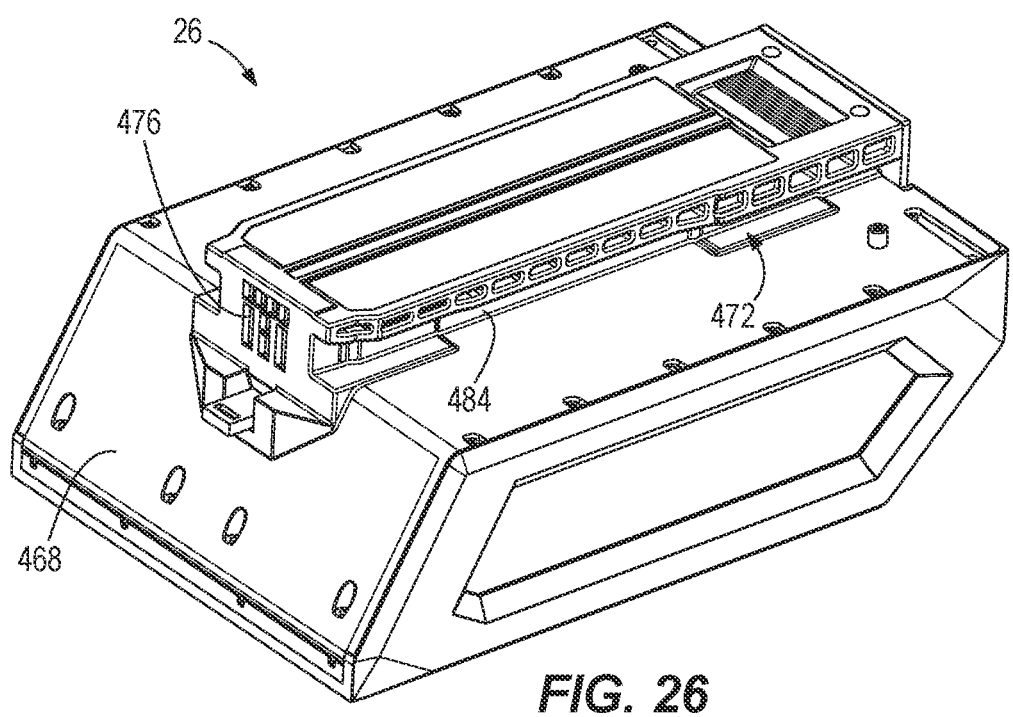
FIG. 26 is a perspective view of a battery pack of the percussion tool of FIG. 20.
Figure 27:
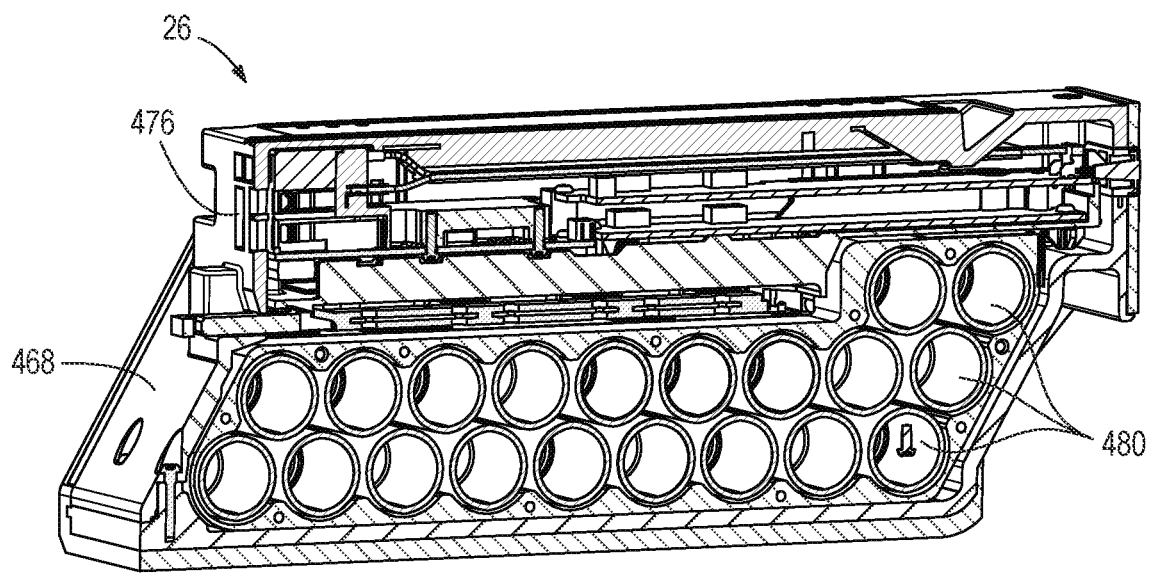
FIG. 27 is a cross-sectional view of the battery pack of FIG. 26.

As shown in FIGS. 20 and 21, the battery pack 26 is removably received in a battery receptacle 464 on the front side 17 of the housing 14 to transfer current from the battery pack 26 to the motor 18 via the controller 250. With reference to FIGS. 26 and 27, the battery pack 26 includes a battery pack housing 468 with a support portion 472 and a first terminal 476 that is electrically connected to a plurality of battery cells 480 within the pack housing 468. The support portion 472 provides a slide-on arrangement with a projection/recess portion 484 cooperating with a complementary projection/recess portion 488 (shown in FIGS. 20 and 21) of the battery receptacle 464. In the embodiment illustrated in FIGS. 20, 21 and 26, the projection/recess portion 484 of the battery pack 26 is a guide rail and the projection/recess portion 488 of the battery receptacle 464 is a guide recess. A similar battery pack is described and illustrated in U.S. patent application Ser. No. 16/025,491 filed Jul. 2, 2018, the entire content of which is incorporated herein by reference. In some embodiments, the battery cells 480 have a nominal voltage of up to about 80 V. In some embodiments, the battery cells 480 have a nominal voltage of up to about 120 V. In some embodiments, the battery pack 26 has a weight of up to about 6 lb. In some embodiments, each of the battery cells 480 has a diameter of up to 21 mm and a length of up to about 71 mm. In some embodiments, the battery pack 26 includes up to twenty battery cells 480. In some embodiments, the battery cells 480 are two cell strings of twenty series connected cells, the cell strings being connected in parallel. In some embodiments, the battery cells 480 are operable to output a sustained operating discharge current of between about 40 A and about 60 A. In some embodiments, each of the battery cells 480 has a capacity between about 3.0 Ah and about 5.0 Ah.

FIG. 21 illustrates the battery receptacle 464 of the breaker 10 in accordance with some embodiments. The battery receptacle 464 includes the projection/recess 488, a second terminal 492, a latch 496, and a power disconnect switch. The projection/recess 488 cooperates with the projection/recess 484 of the battery pack 26 to attach the battery pack 26 to the battery receptacle 464 of the breaker 10. When the battery pack 26 is attached to the breaker 10, the second terminal 492 and the first terminal 476 are electrically connected to each other. The latch 496 protrudes from a surface of the battery receptacle 464 and is configured to engage the battery pack 26 to maintain engagement between the battery pack 26 and the battery receptacle 464. Thus, the battery pack 26 is connectable to and supportable by the battery receptacle 464 such that the battery pack 26 is supportable by the housing 14 of the breaker 10.

In other embodiments (not shown), the latch 496 may be disposed at various locations (e.g., on a sidewall, an end wall, an upper end wall etc., of the battery receptacle 464) such that the latch 496 engages corresponding structure on the battery pack 26 to maintain engagement between the battery pack 26 and the battery receptacle 464. The latch 496 is slidably disposed in the receptacle 464 and is biased toward a latching position by a biasing member to protrude through a surface of the battery receptacle 464 and into a cavity in the battery pack 26. The latch 496 is moveable to an unlatched position by an actuator 500 (FIG. 21).

The power disconnect switch (e.g., a micro-switch) facilitates electrical connection/disconnection of the battery pack 26 from the battery receptacle 464 during actuation of the actuator 500 to withdraw the latch 496 from the battery pack 26. The power disconnect switch may act to electrically disconnect the battery pack 26 from the breaker 10 prior to removal of the battery pack 26 from the battery receptacle 464. The power disconnect switch is actuated when the latch member 500 is moved from the latched position (i.e., when the latch member 500 is completely within the cavity of the battery pack 26) to an intermediate position. The power disconnect switch is electrically connected to the controller 250 and may generate an interrupt to indicate that the battery pack 26 is being disconnected from the breaker 10. When the controller 250 receives the interrupt, the controller 250 begins a power down operation to safely power down the breaker 10. A similar latching mechanism and disconnect switch is described and illustrated in U.S. patent application Ser. No. 16/025,491, which has been incorporated herein by reference.

Figure 28:
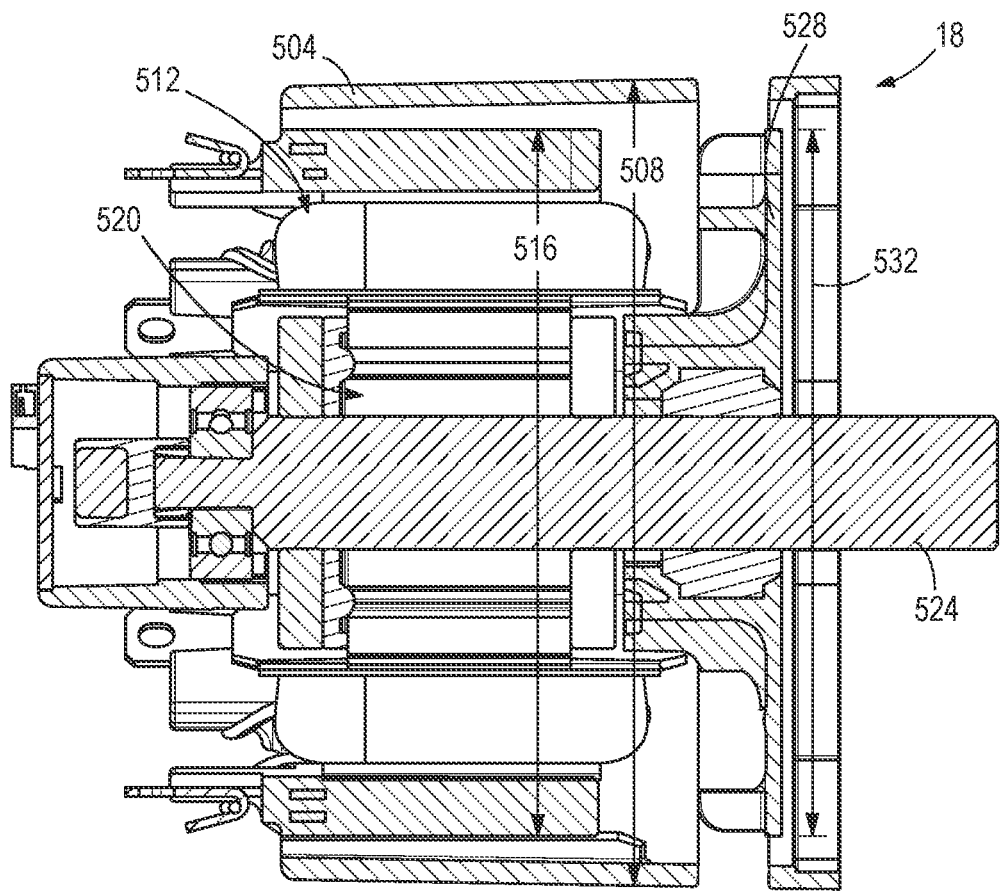
FIG. 28 is a cross-sectional view of a motor of the percussion tool of FIG. 20.

As shown in FIG. 28, in some embodiments, the motor 18 includes a motor housing 504 having an outer diameter 508, a stator 512 having a nominal outer diameter 516 of up to about 80 mm, a rotor 520 having an output shaft 524 and supported for rotation within the stator 512, and a fan 528. A similar motor is described and illustrated in U.S. patent application Ser. No. 16/025,491, which has been incorporated herein by reference. In some embodiments, the motor 18 is a brushless direct current motor. In some embodiments, the motor 18 has a power output of at least about 2760 W. In some embodiments, the fan 528 has a diameter 532 that is larger than the outer diameter 508 of the motor housing 504. In some embodiments, the motor 18 can be stopped with an electronic clutch (not shown) for quick overload control. In some embodiments, the motor 18 has a volume of up to about 443,619 mm³. In some embodiments, the motor 18 has a weight of up to about 4.6 lb. The housing 14 includes an inlet vent and an outlet vent, such that the motor fan 528 pulls air through the inlet vent and along the control electronics to cool the control electronics before the air is exhausted through the outlet vent.

The table below shows some of the performance characteristics of the breaker 10 that are achieved with the battery pack 26 and the motor 18 as described above, compared to a prior art breaker. The first row of the table shows the categories of performance characteristics, including the impact energy (J) for each impact of the striker 70 on a chisel, the blow frequency of the striker 70 (on the chisel, measure in beats per minute (bpm)), the blow power (W) of each impact on the chisel, the impact energy to mass ratio (J/kg), the power to weight ratio (W/kg), and the impact energy per minute (kJ/min) delivered by the chisel. The second row of the table shows the measured performance characteristics of a prior art corded AC breaker. The third row of the table shows the measured performance characteristics of the breaker 10.

|  | Mass (kg) | Impact Energy (J) | Blow Frequency (bpm) | Blow Power (W) | Impact Energy/ Mass (J/kg) | Power/ Mass (W/kg) | Impact Energy (kJ)/ minute |
|---|---|---|---|---|---|---|---|
| Prior Art Breaker | 25.0 | 64.0 | 1300 | 1387 | 2.6 | 55.5 | 83.2 |
| Breaker 10 | 28.0 | 74.6 | 1224 | 1521 | 2.7 | 54.4 | 91.3 |

Notably, the battery powered breaker 10 is able to achieve a higher impact energy (J) and blow power (W) per impact of the chisel 24 than the prior art corded AC breaker, thus allowing the breaker 10 to deliver more impact energy (kJ) per minute. Also, the breaker 10 has a higher impact energy to weight ratio (W/kg) as the prior art AC breaker, and also a close power to mass ratio (W/kg), despite being battery powered. Thus, the breaker 10 affords an operator greater operational convenience due to its enhanced portability, while still achieving greater or nearly the same performance characteristics as the prior art corded AC breaker.

Various features of the invention are set forth in the following claims.

What is claimed is:

1. A percussion tool comprising:
   a housing;
   a percussion mechanism including a striker supported for reciprocation in the housing along a first axis;
   a crank case for supporting the percussion mechanism within the housing; and
   an anti-vibration system for attenuating vibration in a direction of the first axis, the anti-vibration system comprising
      a linkage coupling the percussion mechanism to the housing, the linkage permitting relative movement between the housing and the percussion mechanism along the first axis, the linkage including
         a first swing arm pivotally coupling the crank case to the housing,
         a second swing arm parallel to the first swing arm, the second swing arm pivotally coupling the crank case to the housing,
         wherein the first and second swing arms are coupled to each other by a cross bar extending over the crank case, and
      a counterweight supported by the percussion mechanism for relative movement therewith along a second axis that is parallel with the first axis, the counterweight reciprocating out of phase with the striker to attenuate vibration in the direction of the first axis.

2. The percussion tool of claim 1, wherein the linkage includes a third swing arm pivotally coupling the crank case to the housing.

3. The percussion tool of claim 1, wherein the anti-vibration system further includes a leaf spring arranged between the housing and the crank case, wherein the leaf spring attenuates vibration transmitted to an operator through the crank case and the housing.

4. The percussion tool of claim 1, wherein the anti-vibration system further includes a foam bumper arranged between the housing and the crank case, wherein the foam bumper attenuates vibration transmitted to an operator through the crank case and the housing.

5. The percussion tool of claim 1, wherein the anti-vibration system further includes a first pair of springs arranged on a first side of the counterweight and a second pair of springs arranged on a second side of the counterweight that is opposite the first side, the first pair of springs biasing the counterweight in a first direction and the second pair of springs biasing the counterweight in a second direction that is opposite the first direction.

6. The percussion tool of claim 1, further comprising a crank case for supporting the percussion mechanism within the housing, wherein the counterweight is arranged partially within the crank case.

7. The percussion tool of claim 1, wherein the counterweight has a mass between 500 grams and 1,000 grams.

8. The percussion tool of claim 1, wherein a natural frequency of the anti-vibration system is between 20 Hz and 23 Hz.

9. The percussion tool of claim 1, wherein the percussion tool has a ratio of blow power to mass that is greater than or equal to 50 W/kg.

10. The percussion tool of claim 1, wherein the percussion tool delivers greater than or equal to 85 kJ of impact energy per minute.

11. A percussion tool comprising:
a housing;
a percussion mechanism including a striker supported for reciprocation in the housing along a first axis;
a crank case supporting the percussion mechanism within the housing; and
an anti-vibration system for attenuating vibration in a direction of the first axis, the anti-vibration system comprising
a linkage coupling the percussion mechanism to the housing, the linkage permitting relative movement between the housing and the percussion mechanism along the first axis, the linkage including
a first swing arm pivotally coupling the crank case to the housing, and
a second swing arm pivotally coupling the crank case to the housing, the second swing arm being parallel with the first swing arm,
a third swing arm pivotally coupling the crank case to the housing, the third swing arm extending around the crank case,
a leaf spring arranged between the housing and the crank case, and
a foam bumper arranged between the housing and the crank case, wherein each of the leaf spring and the foam bumper attenuates vibration transmitted to an operator through the crank case and the housing,
wherein the first and second swing arms pivot about a third axis and the third swing arm pivots about a fourth axis, and wherein the fourth axis is parallel to the third axis.

12. The percussion tool of claim 11, wherein the first and second swing arms pivot about a third axis and the third swing arm pivots about a fourth axis, and wherein the fourth axis is parallel to the third axis.

13. The percussion tool of claim 11, wherein each of the leaf spring and the foam bumper is coupled to a top end of the housing.

14. A percussion tool comprising:
a housing;
a percussion mechanism including a striker supported for reciprocation in the housing along a first axis;
a crank case supporting the percussion mechanism within the housing; and
an anti-vibration system for attenuating vibration in a direction of the first axis, the anti-vibration system comprising
a counterweight supported by the percussion mechanism for relative movement therewith along a second axis that is parallel with the first axis, the counterweight reciprocating out of phase with the striker to attenuate vibration in the direction of the first axis, and
a linkage coupling the percussion mechanism to the housing, the linkage permitting relative movement between the housing and the percussion mechanism along the first axis, the linkage including
a first swing arm pivotally coupling the crank case to the housing, and
a second swing arm pivotally coupling the crank case to the housing, the first and second swing arms each pivoting about a third axis, and
a third swing arm pivotally coupling the crank case to the housing, the third swing arm pivoting about a fourth axis that is parallel to the third axis.

15. The percussion tool of claim 14, wherein the anti-vibration system further includes a first spring arranged on a first side of the counterweight and a second spring arranged on a second side of the counterweight that is opposite the first side, and wherein the first spring biases the counterweight in a first direction and the second spring biases the counterweight in a second direction that is opposite the first direction.

16. The percussion tool of claim 15, wherein the first spring and the second spring are identical such that the counterweight is biased toward a neutral position.

* * * * *